(12) United States Patent
Posner et al.

(10) Patent No.: US 8,332,383 B2
(45) Date of Patent: Dec. 11, 2012

(54) METHOD AND SYSTEM TO PROCESS A DATA SEARCH REQUEST

(75) Inventors: Nicholas David Posner, San Carlos, CA (US); Ramana M. Idury, Sunnyvale, CA (US); Richard Douglas Henderson, San Jose, CA (US); Randall Scott Shoup, San Francisco, CA (US); Vijay Kumar, Santa Clara, CA (US); Louis Marcel Gino Monier, Menlo Park, CA (US); Anselm Paul Baird-Smith, San Jose, CA (US); Thomas Nelson, Santa Cruz, CA (US); Raghav Gupta, Sunnyvale, CA (US); Raffi Tutundjian, San Francisco, CA (US); Preston Grant Smalley, Danville, CA (US); Alvaro Bolivar, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 1294 days.

(21) Appl. No.: 11/238,643

(22) Filed: Sep. 29, 2005

(65) Prior Publication Data

US 2006/0265391 A1    Nov. 23, 2006

Related U.S. Application Data

(63) Continuation of application No. PCT/US2005/017024, filed on May 16, 2005.

(51) Int. Cl.
*G06F 7/00* (2006.01)
(52) U.S. Cl. ......................................... 707/708; 707/728
(58) Field of Classification Search .................. 707/3, 5, 707/708, 728
See application file for complete search history.

(56) References Cited

U.S. PATENT DOCUMENTS

| 5,278,980 | A | * | 1/1994 | Pedersen et al. ................. 707/4 |
| 5,424,947 | A | | 6/1995 | Nagao et al. |
| 5,717,913 | A | | 2/1998 | Driscoll |
| 5,926,811 | A | | 7/1999 | Miller et al. |
| 6,012,153 | A | | 1/2000 | Brink et al. |

(Continued)

FOREIGN PATENT DOCUMENTS

WO    WO-2006124027 A1    11/2006

(Continued)

OTHER PUBLICATIONS

U.S. Appl. No. 11/363,679, Non-Final Office Action mailed Oct. 9, 2008, 11 pgs.

(Continued)

*Primary Examiner* — James Trujillo
*Assistant Examiner* — Linh Black
(74) *Attorney, Agent, or Firm* — Schwegman Lundberg & Woessner, P.A.

(57) ABSTRACT

A method and system to process a data search request. The system includes a query controller module to receive the data search request that includes constraints; a reduced constraint builder module to formulate a plurality of search definitions that are formulated to exclude at least one constraint; and a search engine to perform searches of a data source to generate search results and to utilize the search results to calculate counts of data items that respectively correspond to the search definitions. The query controller module communicates the counts of data items and the corresponding search definitions to a client machine. Each of the search definitions is formulated to include a constraint set.

59 Claims, 26 Drawing Sheets

QUERY = CONSTRAINT 1 AND CONSTRAINT 2 AND CONSTRAINT N

CONSTRAINT TYPES
KEYWORD CONSTRAINT
ATTRIBUTE CONSTRAINT
SEARCH PARAMETER CONSTRAINT
CATEGORY CONSTRAINT

U.S. PATENT DOCUMENTS

| | | | |
|---|---|---|---|
| 6,081,774 | A | 6/2000 | de Hita et al. |
| 6,246,977 | B1 | 6/2001 | Messerly et al. |
| 6,363,377 | B1 | 3/2002 | Kravets et al. |
| 6,411,950 | B1 | 6/2002 | Moricz et al. |
| 6,516,312 | B1 | 2/2003 | Kraft et al. |
| 6,598,039 | B1 | 7/2003 | Livowsky |
| 6,854,035 | B2 * | 2/2005 | Dunham et al. .............. 711/117 |
| 6,941,293 | B1 | 9/2005 | Dean et al. |
| 7,120,574 | B2 | 10/2006 | Troyanova et al. |
| 7,124,129 | B2 | 10/2006 | Bowman et al. |
| 7,246,129 | B2 | 7/2007 | Lawrence et al. |
| 7,287,025 | B2 | 10/2007 | Wen et al. |
| 7,330,811 | B2 | 2/2008 | Turcato et al. |
| 7,630,986 | B1 * | 12/2009 | Herz et al. ...................... 707/10 |
| 2001/0000356 | A1 * | 4/2001 | Woods .............................. 707/3 |
| 2001/0037325 | A1 * | 11/2001 | Biderman et al. ................ 707/1 |
| 2002/0049752 | A1 | 4/2002 | Bowman et al. |
| 2002/0184206 | A1 | 12/2002 | Evans et al. |
| 2003/0014405 | A1 | 1/2003 | Shapiro |
| 2003/0041058 | A1 * | 2/2003 | Ibuki et al. ........................ 707/4 |
| 2003/0069877 | A1 * | 4/2003 | Grefenstette et al. ............ 707/2 |
| 2003/0069880 | A1 | 4/2003 | Harrison et al. |
| 2003/0182422 | A1 * | 9/2003 | Bradshaw et al. ........... 709/225 |
| 2003/0212666 | A1 | 11/2003 | Basu et al. |
| 2004/0194141 | A1 * | 9/2004 | Sanders ......................... 725/53 |
| 2004/0199491 | A1 | 10/2004 | Bhatt |
| 2004/0230572 | A1 * | 11/2004 | Omoigui ........................... 707/3 |
| 2004/0243560 | A1 * | 12/2004 | Broder et al. ..................... 707/3 |
| 2004/0243645 | A1 * | 12/2004 | Broder et al. ................. 707/200 |
| 2005/0004889 | A1 * | 1/2005 | Bailey et al. ...................... 707/1 |
| 2005/0022114 | A1 * | 1/2005 | Shanahan et al. ............ 715/513 |
| 2005/0027705 | A1 | 2/2005 | Sadri et al. |
| 2005/0050030 | A1 * | 3/2005 | Gudbjartsson et al. ........... 707/3 |
| 2005/0055342 | A1 * | 3/2005 | Bharat et al. ...................... 707/3 |
| 2005/0065811 | A1 * | 3/2005 | Chu et al. .......................... 705/1 |
| 2005/0065920 | A1 | 3/2005 | He et al. |
| 2005/0108200 | A1 | 5/2005 | Meik et al. |
| 2005/0131872 | A1 * | 6/2005 | Calbucci et al. .................. 707/3 |
| 2005/0154690 | A1 | 7/2005 | Nitta et al. |
| 2005/0210008 | A1 * | 9/2005 | Tran et al. ......................... 707/3 |
| 2005/0210383 | A1 * | 9/2005 | Cucerzan et al. ............. 715/533 |
| 2005/0289168 | A1 * | 12/2005 | Green et al. .................. 707/101 |
| 2006/0036503 | A1 | 2/2006 | Schweier et al. |
| 2007/0203929 | A1 | 8/2007 | Bolivar |

FOREIGN PATENT DOCUMENTS

| | | | |
|---|---|---|---|
| WO | WO-2007100812 | A2 | 9/2007 |
| WO | WO-2007100812 | A3 | 9/2007 |

OTHER PUBLICATIONS

U.S. Appl. No. 11/363,679 Response filed Mar. 9, 2009 to Non-Final Office Action mailed Oct. 9, 2008, 8 pgs.

U.S. Appl. No. 11/363,679, Final Office Action mailed Jun. 17, 2009, 8 pgs.

U.S. Appl. No. 11/363,679, Response filed Aug. 17, 2009 to Final Office Action mailed Jun. 17, 2009, 8 pgs.

Chinese Application Serial No. 200780015514.2,Office Action Mailed Nov. 6, 2009, 3 pgs.

European Application No. 05770183.1, Search Report mailed on Nov. 3, 2009, 4 pgs.

European Application No. 07751791.0, Search Report mailed Nov. 24, 2009, 3 pgs.

Marti, H., "Chapter 10: User Interfaces and Visualization", *Modern Information Retrieval*, (1999), 257-323 pgs.

Zukerman, I, et al., "Query expansion and query reduction in document retrieval", *Proceedings 15th IEEE International Conference on Tools With Artificial Intelligence. ICTAI 2003*. Sacramento. CA., (Nov. 3-5, 2003).

"International Search Report and Written Opinion PCT/US05/17024", PCT/US05/17024, 4 pgs.

U.S. Appl. No. 11/363,679, Non-Final Office Action mailed Mar. 19, 2010, 8 pgs.

"U.S. Appl. No. 11/363,679 Final Office Action mailed Sep. 24, 2010", 10.

"U.S. Appl. No. 11/363,679, Advisory Action mailed Aug. 25, 2009", 3 pgs.

"U.S. Appl. No. 11/363,679, Appeal Brief filed Dec. 17, 2009", 23 pgs.

"U.S. Appl. No. 11/363,679, Response filed Aug. 18, 2008 to Restriction Requirement mailed Jun. 18, 2008", 5 pgs.

"U.S. Appl. No. 11/363,679, Response filed Sep. 17, 2010 to Non Final Office Action mailed Mar. 19, 2010", 7 pgs.

"U.S. Appl. No. 11/363,679, Response filed Dec. 23, 2010 to Final Office Action mailed Sep. 24, 2010", 8 pgs.

"U.S. Appl. No. 11/363,679, Restriction Requirement mailed Jun. 18, 2008", 7 pgs.

"Chinese Application Serial No. 200580051098.2 ,Office Action mailed Aug. 4, 2010", 3 pgs.

"U.S. Appl. No. 11/363,679, Non Final Office Action mailed Jan. 24, 2011", 8 pgs.

"U.S. Appl. No. 11/363,679, Non-Final Office Action mailed Jan. 24, 2011", 8 pgs.

"Chinese Application Serial No. 200580051098.2, Response filed Dec. 17, 2010 to Non Final Office Action mailed Aug. 4, 2010", 18 pgs.

"Chinese Application Serial No. 200780015514.2, Response filed Mar. 22, 2010", 10 pgs.

"European Application Serial No. 05770183.1, Office Action mailed Dec. 10, 2010".

"European Application Serial No. 07751791.0, Examiner Notification mailed Aug. 1, 2011", 7 pgs.

"International Application Serial No. PCT/US2005/017024, International Preliminary Report on Patentability mailed Nov. 29, 2007", 5 pgs.

"International Application Serial No. PCT/US2005/017024, International Search Report and Written Opinion mailed Dec. 28, 2005", 8 pgs.

"International Application Serial No. PCT/US2007/005057, International Preliminary Report on Patentability mailed Sep. 12, 2008", 6 pgs.

"International Application Serial No. PCT/US2007/005057, International Search Report and Written Opinion mailed Feb. 7, 2008", 11 pgs.

"U.S. Appl. No. 11/363,679, Response filed May 10, 2011 to Non-Final Office Action Jan. 24, 2011", 8 pgs.

"European Application No. 05770183.1—Office Action Response", 20 pgs.

"European Application No. 07751791.0—Office Action Response", 17 pgs.

* cited by examiner

FIGURE 4
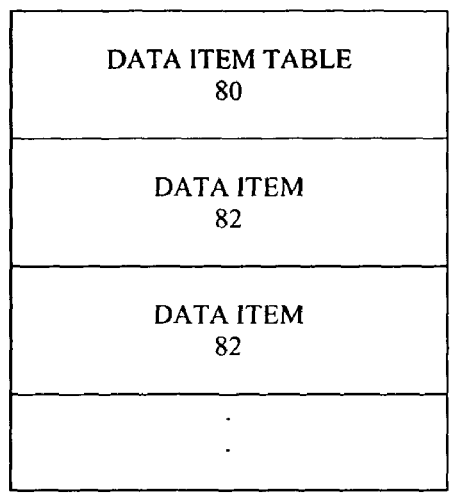
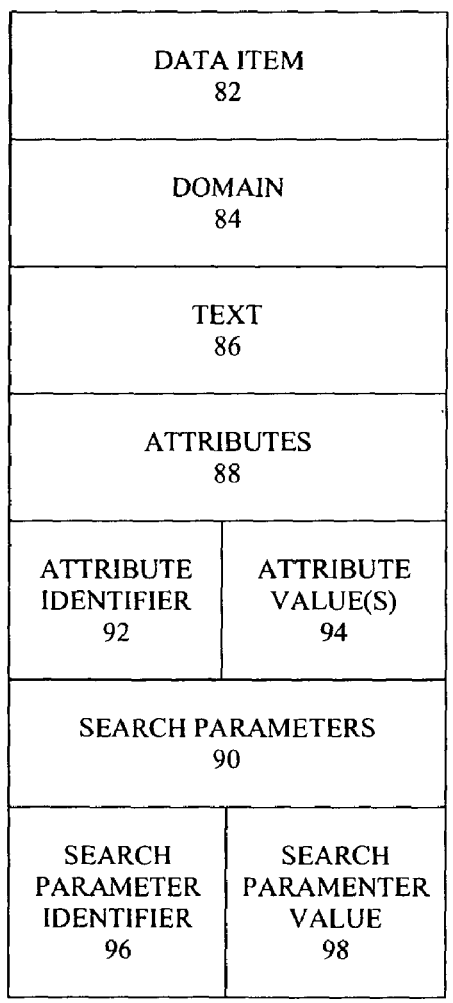

FIGURE 5A 100    102    102    102

QUERY = CONSTRAINT 1 AND CONSTRAINT 2 AND CONSTRAINT N

CONSTRAINT TYPES — 104
KEYWORD CONSTRAINT — 106
ATTRIBUTE CONSTRAINT —
SEARCH PARAMETER CONSTRAINT — 108
CATEGORY CONSTRAINT — 110

FIGURE 5B    106    104    108

QUERY = A1, A2, KW1, KW2, SP1, SP2    111    103

| | SEARCH DEFINITIONS | BASE QUERIES | DATA ITEM COUNTERS |
|---|---|---|---|
| 101 → | ~~SP1~~ SP2 | KW1 KW2 A1 A2 | N |
| 107 | SP1 ~~SP2~~ | KW1 KW2 A1 A2 | N |
| | ~~SP1~~ ~~SP2~~ | KW1 KW2 A1 A2 | N |
| | ~~KW1~~ KW2 | SP1 SP2 A1 A2 | N |
| 105 | KW1 ~~KW2~~ | SP1 SP2 A1 A2 | N |
| | ~~KW1~~ ~~KW2~~ | SP1 SP2 A1 A2 | N |
| | ~~A1~~ A2 | KW1 KW2 SP1 SP2 | N |
| 109 | A1 ~~A2~~ | KW1 KW2 SP1 SP2 | N |
| | ~~A1~~ ~~A2~~ | KW1 KW2 SP1 SP2 | N |

FIGURE 5C    113

EXPANSION    102    102    102

CONSTRAINT A = CONSTRAINT A OR CONSTRAINT B

FIGURE 6

| CONFIGURATION TABLE 112 |
|---|
| MINIMUM CONSTRAINTS 120 |
| MAXIMUM CONSTRAINTS 122 |
| MINIMUM DATA ITEMS 124 |
| MAXIMUM DATA ITEMS 126 |
| DISPLAY COLUMNS 128 |
| DISPLAY ROWS 130 |

| STOPWORDS TABLE 114 |
|---|
| KEYWORD CONSTRAINTS 104 (E.G., WAS, IS, THE) |
| |
| |
| |

| KEYWORDS EXPANSION TABLE 116 ||
|---|---|
| KEYWORD CONSTRAINTS 104 (E.G., BOOK) | EXPRESSION 136 E.G., (BOOK OR BOOKS) |
| | |
| | |

| PHRASES TABLE 118 ||
|---|---|
| KEYWORD CONSTRAINTS 104 (E.G., "HARRY" "POTTER") | ATOMIC EXPRESSION 138 (E.G., "HARRY POTTER") |
| | |
| | |

FIGURE 7

| KEYWORD CROSS-TYPE EXPANSION TABLE 140 ||
|---|---|
| KEYWORD CONSTRAINT 104 (E.G., KEYWORD - ACTION FIGURE) | EXPRESSION 136  (E.G., (KEYWORD CONSTRAINT 104 (E.G., ACTION FIGURE)) OR (CATEGORY CONSTRAINT 110) OR (SPECIAL PARAMETER CONSTAINT 108) OR ATTIRBUTE CONSTRAINT 106) ) |

| CATEGORY CROSS-TYPE EXPANSION TABLE 142 ||
|---|---|
| CATEGORY CONSTRAINT 110 (E.G., ACTION FIGURE) | EXPRESSION 136  (E.G., (CATEGORY CONSTRAINT 110 (E.G., ACTION FIGURE)) OR (KEYWORD CONSTRAINT 104) OR (SEARCH PARAMETER CONSTRAINT 108) OR ATTIRBUTE CONSTRAINT 106) ) |

| SEARCH PARAMETER CROSS-TYPE EXPANSION TABLE 144 ||
|---|---|
| SEARCH PARAMETER CONSTRAINT 108 (E.G., PRICE - $1) | EXPRESSION 136  (E.G., (SEARCH PARMETER CONSTRAINT 108 (E.G., PRICE - $1)) OR (CATEGORY CONSTRAINT 110) OR (KEYWORD CONSTRAINT 104) OR ATTIRBUTE CONSTRAINT 106) ) |

| ATTRIBUTE CROSS-TYPE EXPANSION TABLE 146 ||
|---|---|
| ATTRIBUTE CONSTRAINT 106 (E.G., VIDEO GAME SYSTEM/ X BOX) | EXPRESSION 136  (E.G., (ATTRIBUTE/CONSTRAINT 106 (E.G., VIDEO GAME - XBOX)) OR (CATEGORY CONSTRAINT 110) OR (SEARCH PARAMETER CONSTRAINT 108) OR KEYWORD CONSTRAINT 104) ) |

METHOD AND SYSTEM TO PROCESS A
DATA SEARCH REQUEST

RELATED APPLICATION

The present patent application is a Continuation under 35 U.S.C. 111(a) of International Application No. PCT/US2005/017024, filed 16 May 2005, which application is incorporated herein by reference.

TECHNICAL FIELD

An embodiment relates generally to the technical field of search automation and, in one example embodiment, to a method and system to process a data search request.

BACKGROUND

A search engine is a tool that identifies data items in a data source based on a data search request that is entered by a user. The search engine utilizes keywords or other types of constraints entered by the user to identify data items that are of interest to the user. Sometimes a search engine returns search results that include few if any data items because the data search request includes too many constraints. In such instances the user may remove constraints to increase the number of data items to returned; however, the user may not readily understand which constraints to remove because removing one constraint may result in returning too many data items and removing another constraint may result in returning few if any data items.

SUMMARY OF THE INVENTION

According to a first aspect of the invention a system to process a data search request includes a query controller module to receive, via an interface of a computer system, the data search request, the data search request including a plurality of constraints; a reduced constraint builder module to formulate, within the computer system, a plurality of search definitions, each search definition of a subset of the plurality of search definitions being formulated to utilize the plurality of constraint and to exclude at least one constraint; and a search engine to perform a plurality of searches of a data source to generate a plurality of search results and to utilize the plurality of search results to calculate, within the computer system, a plurality of counts of data items that respectively correspond to the subset of the plurality of search definitions, the query controller module to communicate, via the interface of the computer system, the plurality of counts of data items and the corresponding subset of the plurality of search definitions to a client machine, wherein each of the search definitions is formulated to include a constraint set.

BRIEF DESCRIPTION OF THE DRAWINGS

An embodiment of the present invention is illustrated by way of example and not limitation in the figures of the accompanying drawings, in which like references indicate similar elements and in which:

FIG. 4 is a block diagram illustrating a data item table, according to one embodiment;

FIG. 5A is a representation of a query, according to one embodiment;

FIG. 5B is a representation of search definitions, base queries and data item counters, according to one embodiment, generated in response to a query 100;

FIG. 5C is a representation of an expansion, according to one embodiment;

FIG. 6 is a block diagram illustrating a configuration table, a stopwords table, a keyword expansion table, and a phrases table;

FIG. 7 is a block diagram illustrating a keyword cross type expansion table, a category cross type expansion table, search parameter cross type expansion table, and an attribute cross type expansion table;

DETAILED DESCRIPTION

A method and system to process a data search request are described. In the following description, for purposes of explanation, numerous specific details are set forth in order to provide a thorough understanding of the present invention. It will be evident, however, to one skilled in the art that the present invention may be practiced without these specific details.

In general, embodiments described below feature a system that responds to a user that has entered an over constrained data search request. The system responds by formulating and presenting a set of search definitions each of which may exclude one or more of the constraints from the original data search request and may be selected by the user for execution as the next data search request. In addition, each of the search definitions may be associated with a calculated count of data items that enables the user to look ahead and anticipate the number of data items that would be returned responsive to execution of the corresponding search definition. For example, a data item count of fifty may indicate a data search request that returns a manageable number of data items. Presentation of search definitions as described above in conjunction with corresponding counts of data items enable the user to make a thoughtful selection of next data search request.

Figure 1:
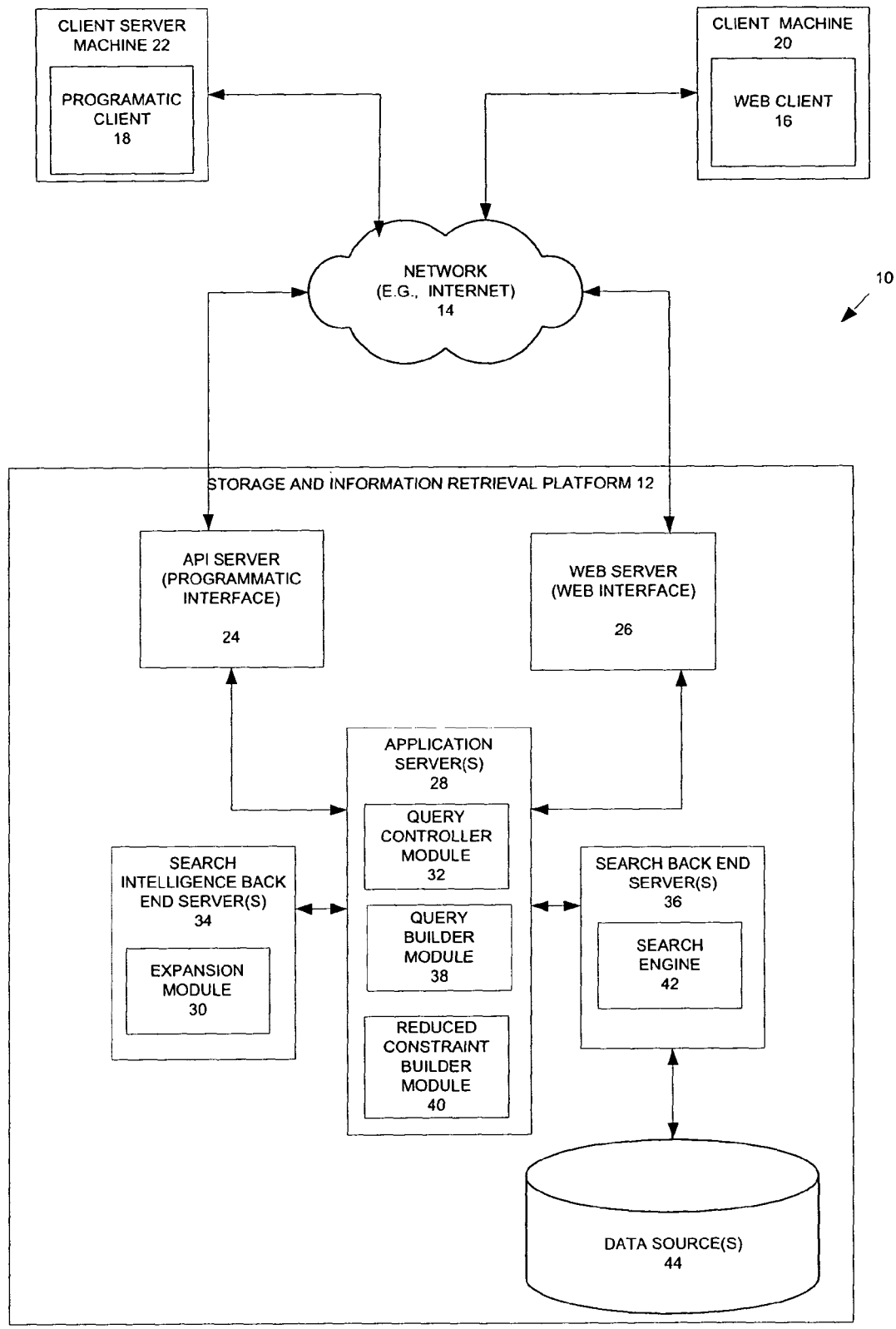
FIG. 1 is a network diagram depicting a system, according to one example embodiment of the present invention.

FIG. 1 is a network diagram depicting a system 10, according to one example embodiment of the present invention, having a client-server architecture. A platform, in the example form of an information storage and retrieval platform 12, provides server-side functionality, via a network 14 (e.g., the Internet) to one or more clients. FIG. 1 illustrates, for example, a web client 16 (e.g., a browser, such as the INTERNET EXPLORER browser developed by Microsoft Corporation of Redmond, Wash. State), and a programmatic client 18 executing on respective client server machines 20 and 22.

Turning specifically to the information storage and retrieval platform 12, an application program interface (API) server 24 and a web server 26 are coupled to, and provide programmatic and web interfaces respectively to, one or more application servers 28. The application servers 28 may host a query controller module 32, a query builder module 38, and a reduced constraint builder module 40. The application servers 28 are, in turn, shown to be coupled to one or more search intelligence back end servers 34 and one or more search back end servers 36. The search intelligence back end servers 34 host an expansion module 30. The search back end servers 36 host a search engine 42 and facilitates access to a data source 44.

The query controller module 32 acts a hub between the client server machines 22 and 20 and the other search modules (e.g., expansion module 30, query builder module 38, reduced constraint builder module 40 and search engine 42). To this end the query controller module 32 communicates via the API server 24 and the web server 26 with the client server machines 22, 20 and communicates directly with the other search modules. The expansion module 30 expands constraints to capture additional data items. The query builder module 38 determines whether reduced constraints search definitions and counters may be presented to the user. The reduced constraint builder module 40 builds a set of search definitions that respectively exclude one or more constraints. The search engine 42 calculates data item counts and performs searches on the data source 44.

While the system 10 shown in FIG. 1 employs a client-server architecture, the present invention is of course not limited to such an architecture, and could equally well find application in a distributed, or peer-to-peer, architecture system. The expansion module 30, query controller module 32, query builder module 38, reduced constraint builder module 40 and search engine 42 (e.g., search modules) could also be implemented as standalone software programs, which do not necessarily have networking capabilities.

The web client 16, it will be appreciated, accesses the various services and functions provided by search modules via the web server 26 supported by the web server 26. Similarly, the programmatic client 18 accesses the various services and functions provided by the search modules via the programmatic interface provided by the API server 24.

Search Architecture and Applications

Figure 2:
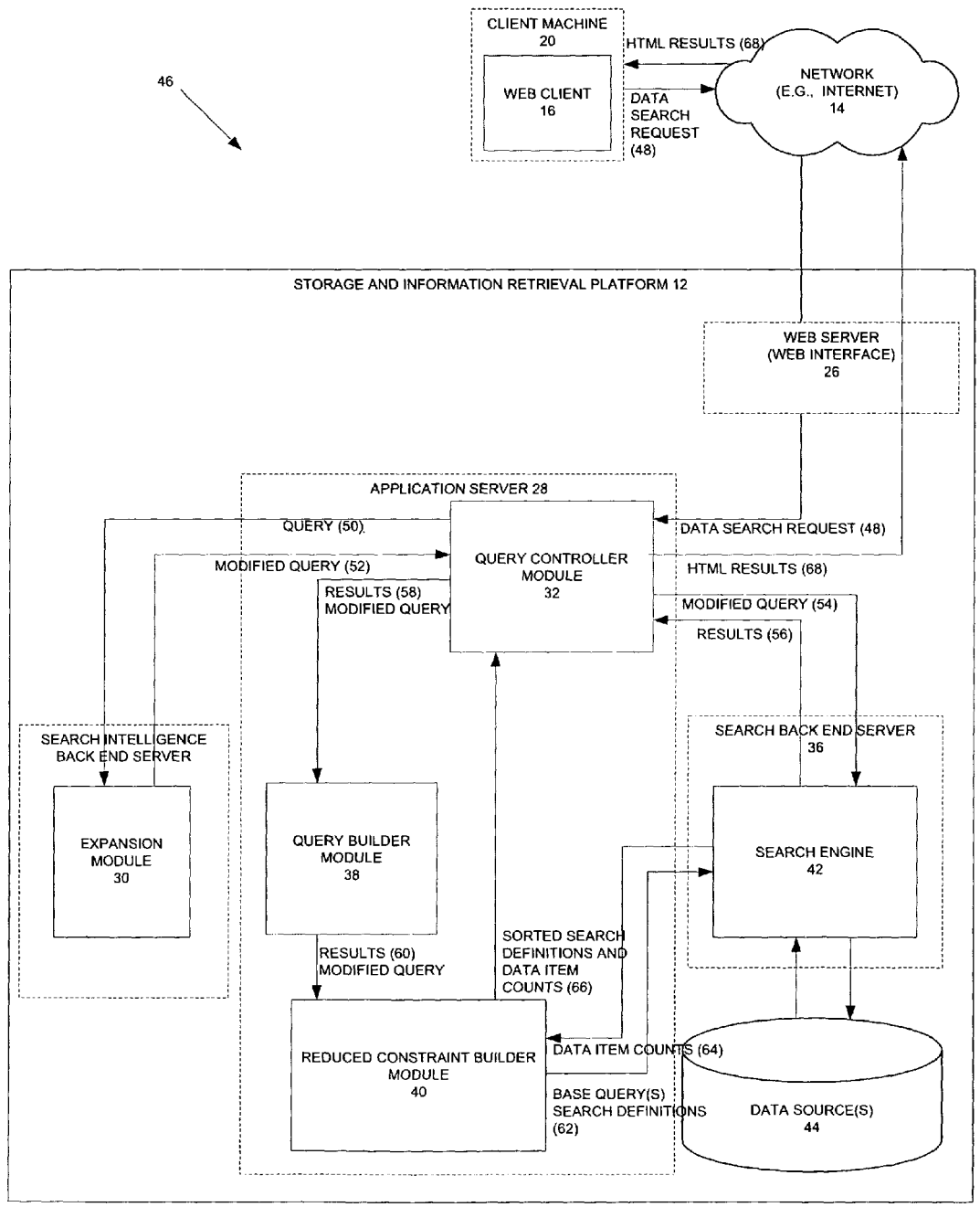
FIG. 2 is a block diagram illustrating a search system as embodied in the information storage and retrieval platform, according to an example embodiment of the present invention.

FIG. 2 is a block diagram illustrating a search system 46 as embodied in the information storage and retrieval platform 12, according to an example embodiment of the present invention. The search system 46 is presented to provide an overview of processing a data search request.

At operation 48 the client machine 20 communicates a data search request to the query controller module 32. For example, the data search request may include the following keyword constraints "Harry," "Potter," and "Book." The query controller module 32 modifies the data search request to form a query according to proper syntax.

At operation 50 the query controller module 32 communicates the query to the expansion module 30 which examines the keyword constraints for expansion. For example, the keyword constraint "book" may be expanded to include a plural form of the word "book" (e.g., Book=(Book OR Books)). Other types of expansion may include alternate spellings, synonyms, acronyms, alternate word forms, etc. The expansion module 30 attempts to expand all the keywords in the data search request and then, at operation 52, communicates the modified query to the query controller module 32 which, in turn at operation 54, communicates the modified query to the search engine 42. At operation 56, the search engine 42 executes the query and communicates the results to the query controller module 32 which, at operation 58, communicates the results and the modified query to the query builder module 38. At operation 60 the query builder module 38 has determined that the data search request has been over constrained (e.g., no or few data items returned) and communicates the results and the modified query to the reduced constraint builder module 40 which, in turn, generates the appropriate search definitions based on the modified query. At operation 62 the reduced constraint builder module communicates the search definitions to the search engine 42 which determines a corresponding data item count for each search definition. At operation 64 the search engine 42 communicates the data item counts or counters to the reduced constraint builder module 40 which, in turn, sorts the search definitions and corresponding data item counts before communicating them to the query controller module 32. Finally, at operation 68, the query controller module 32 communicates the original search results, search definitions that exclude constraints, and corresponding data item counters in the form of HTLML results to the user at the client machine 20.

The above exemplary overview described a data search request that utilized keyword constraints; however, it will be appreciated that other embodiments may describe a data search request that utilizes other types of constraints including category constraints, search parameter constraints and attribute constraints or combinations thereof as described below.

Figure 3:
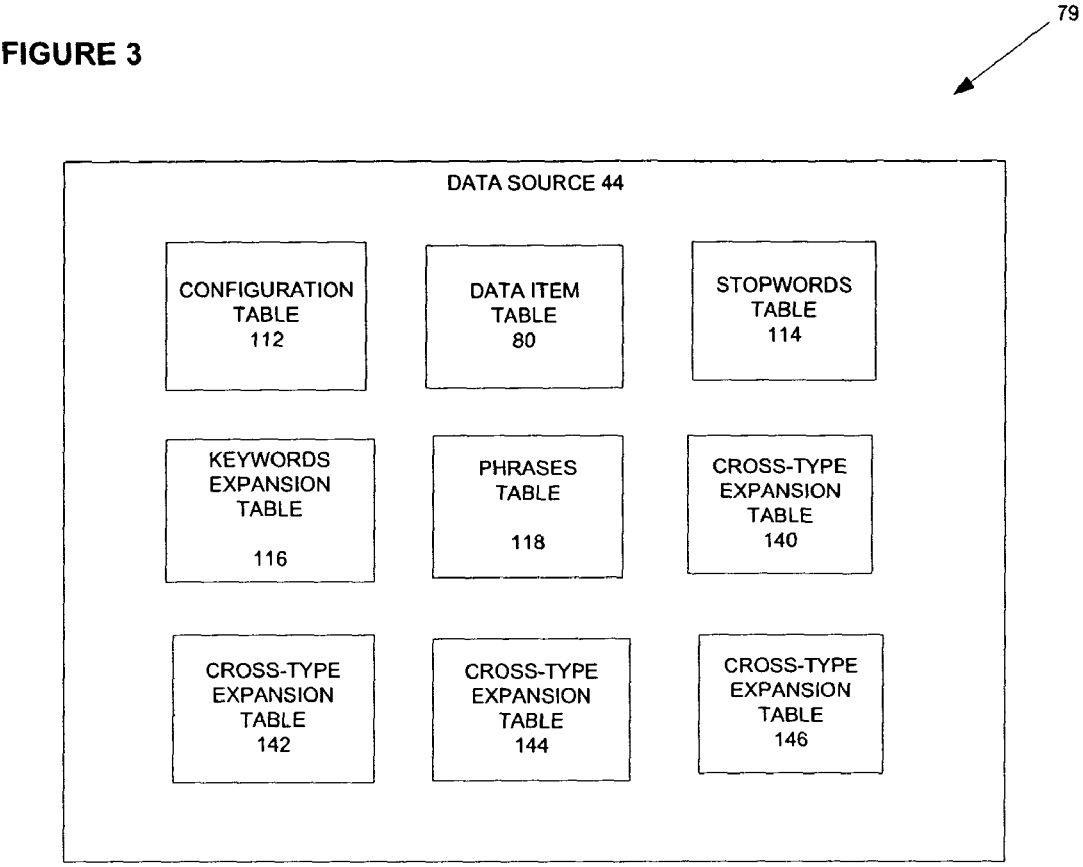
FIG. 3 is a block diagram illustrating database tables, according to one embodiment.

FIG. 3 is a block diagram illustrating database tables 79, according to one embodiment. The exemplary database tables 79 are stored on the data source 44 and include a data item table 80, a configuration table 112, a stopwords table 114, a keyword expansion table 116, a phrases table 118 and cross-type expansion tables 140, 142, 144, 146. The data item table 80 is utilized to store and retrieve data items. The configuration table 112 is utilized to store various configurable parameters that are utilized by the search modules. The configurable parameters stored in the configuration table 112 may be configured by an administrator or user of the storage and information retrieval platform 12. The stopwords table 114 may be utilized to identify one or more keywords that should be removed from a data search request. The phrases table 118 is utilized to identify sets of keywords that should be treated atomically. The keyword expansion table 116 is utilized to expand a keyword constraint to other forms of the keyword constraint and the cross-type expansion tables 140, 142, 144, 146 are utilized to expand one type of constraint to another type of constraint.

FIG. 4 is a block diagram illustrating a data item table 80, according to one embodiment. The data item table 80 is shown to include multiple data items 82. Each data item 82 includes a domain 84, text 86, attributes 88, and search parameters 90. The domain 84 is utilized to distinguish types of data items 82. Example domains 84 may include books, toys, DVDs, etc. The text 86 contains words that may describe the data item 82 or provide information relevant to the data item 82. The attributes 88 provide descriptive information that may be utilized to distinguish data items 82 in the same domain 84. Each attribute 88 includes an attribute identifier 92 that may be associated one or more attribute values 94. For example a book may have an attribute identifier 92 that describes the format of the book and the associated attribute values may include "Hardback" or "Softback." The search parameters 90 provide descriptive information that may be utilized to characterize a data item 82 irrespective of the domain 84. In other words a common set of search parameters 90 may be applicable to all data items 82 irrespective of the domain 84. Each search parameter 90 includes a search parameter identifier 96 that may be associated with one or more search parameter values 98. For example, data items 82 may have a search parameter identifier 96 that describes a sales format in which a data item 82 that is an item for sale may be transacted. The associated search parameter value 98 may include "Buy it Now" or "Auction."

Figure 25:
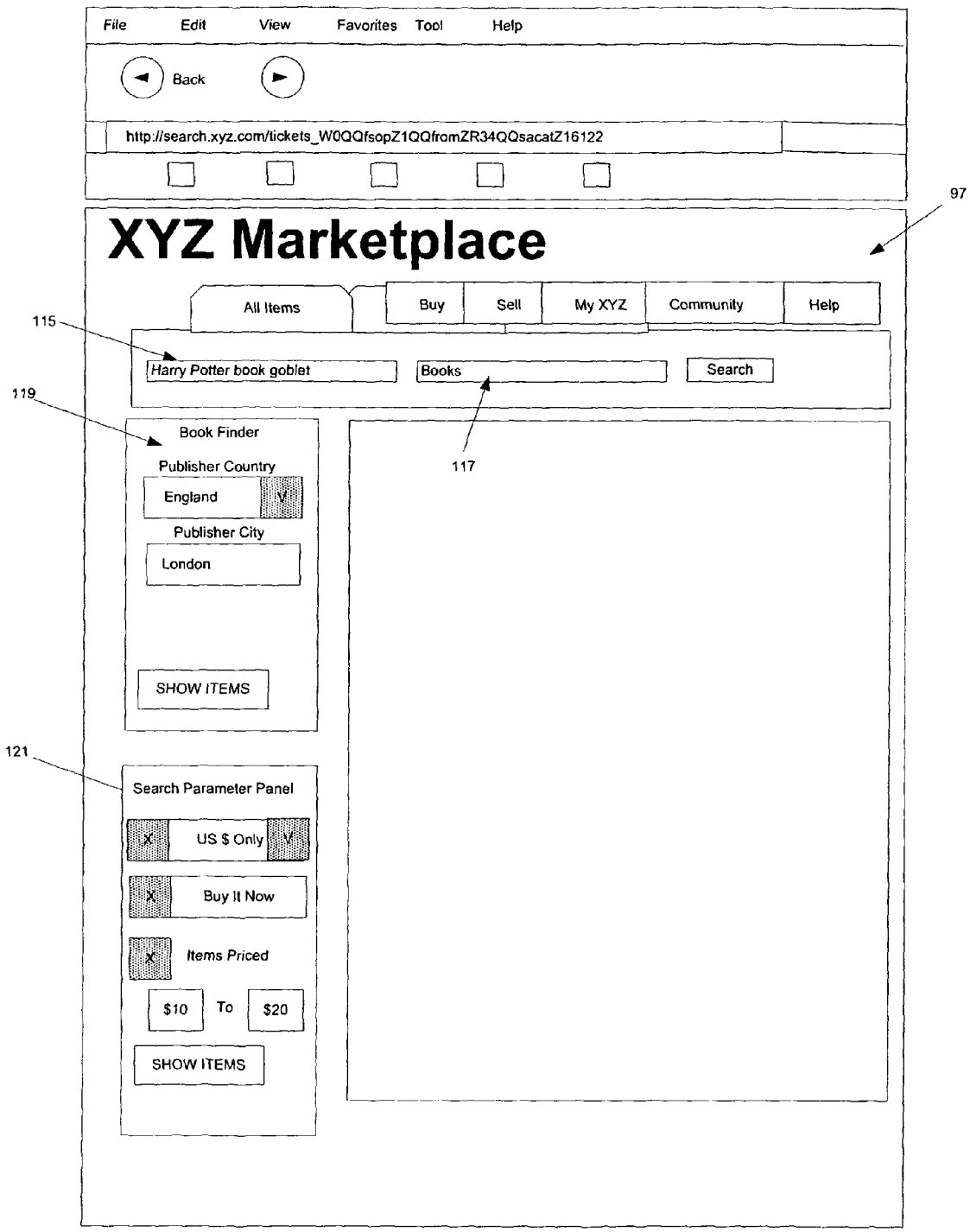

FIG. 5A is a representation of a query 100, according to one embodiment. The query 100 is generated by the query controller module 32 from the data search request. The data search request and query 100 include one or more constraints 102 that may be utilized by the search engine 42 to identify data items 82. Each constraint 102 may be characterized as a keyword constraint 104, an attribute constraint 106, a search parameter constraint 108 and a category constraint 110, which is a type of search parameter constraint 108. The keyword constraint 104 may be utilized to identify data items 82 that contain matching text 86. The attribute constraint 106 may be utilized to identify data items 82 that contain a matching attribute 88. The search parameter constraint 108 may be utilized to identify data items 82 that contain a matching search parameter 90. The category constraint 110 may be utilized to identify data items 82 that contain a matching category which is a type of search parameter 90. FIG. 25 illustrates a user interface 97, according to one embodiment, to enter constraints 102. The user interface 97 includes a keyword input box 115, a category identifier 117, a book finder 119, and a search parameter panel 121. The keyword input box 115 may be utilized by a user to enter keyword constraints 104 (e.g., "Harry", "Potter", "book", "goblet") The category identifier 117 may be utilized to select category constraints 110 (e.g., Books). In another embodiment browsing a hierarchy of categories may be utilized to select a category constraint 110. The book finder 119 may be utilized to select attribute values 94 associated with data items 82 in the "book" domain 84 (e.g., "England, "London") and the search parameter panel 121 may be utilized to select search parameter values 98 (e.g., "US $ Only", "Buy It Now", "$10" to "$20".

FIG. 5B is a representation of search definitions 101, base queries 111 and data item counters 103, according to one embodiment, generated in response to a query 100. The query 100 is shown to include attribute constraints 106 (e.g., A1, A2), keyword constraints 104 (KW1, KW2), and search parameter constraints 108 (SP1, SP2). The query 100 may be utilized to generate a search parameter set 107, a keyword set 105 and an attribute set 109 of search definitions 101, base queries 111 and data item counters 103. Each set 107, 105, 109 is associated with search definitions 101 that systematically exclude constraints 102 of the respective type, base queries 111 that hold constant the remaining constraints 102, and data item counters 103 indicating the number of data items 62 found in the data source 44 with the associated search definition 101 and base query 111. The search definitions 101 are sorted for presentation to the user according to set type 107, 105, 109 (e.g., search definitions 101 associated with reduced search parameter constraints 108 are presented first, search definitions 101 associated reduced keyword constraints 104 are presented second and search definitions 101 associated with reduced attribute constraints 108 are presented third). Within each set type 107, 105, 109 the search definitions 101 are sorted in ascending order according to the number of excluded constraints 102 (e.g., search definitions 101 with one constraint excluded, search definitions with two constraints 102 excluded, etc.). Search definitions that include the same number of excluded constraints are sorted in ascending order according the number of data items 82.

FIG. 5C is a representation of an expansion 113, according to one embodiment. The expansion 113 includes a constraint 102 that may be mapped to an expression that includes the original constraint 102 and one or more additional constraint(s) 102 separated by OR operator(s). The expansion 113 is utilized to capture data items 82 that otherwise would not have been captured with the original constraint 102 but probably should have been captured from the point of view of the user that entered the data search request. As previously discussed, expansions may be utilized to expand a keyword constraint 104 to plural forms, alternate spellings, synonyms, acronyms, alternate word forms, etc. In addition, expansions may be utilized to expand across constraint types. For example, a keyword constraint 104 may be expanded to a category constraint 110 or an attribute constraint 106 or a search parameter constraint 108. Any constraint type may be expanded to any other constraint type or any other combination of constraint types. In addition, a single constraint 102 may be expanded to multiple constraints 102 of another type. For example, the keyword "dog" may be expanded to the category "dogs" and the category "animals."

FIG. 6 is a block diagram illustrating a configuration table 112, a stopwords table 114, a keyword expansion table 116, and a phrases table 118. The configuration table 112 includes fields for minimum constraints 120, maximum constraints 122, minimum data items 124, maximum data items 126, display columns 128 and display rows 130. The minimum constraints 120 specify the minimum number of constraints 102 in a data search request that are required to present search definitions 101 with reduced constraints 102. The maximum constraints 122 specify the maximum number of constraints 102 in a data search request that are required to present search definitions 101 with reduced constraints 102. The minimum data items 124 and the maximum data items 126 specify a range of the number of data items 82 that may be necessary to present search definitions 101 with reduced constraints 102. The range of the number of data items 82 may be compared with the number of data items 82 that are located based on executing the data search request without reducing constraints 102. The display columns 128 and display rows 130 specify the maximum number of columns or rows that may be utilized on a user interface for the presentation of search definitions, each row corresponding to a search definition 101 in a list of constraint sets and each column corresponding to a search definition 101 in a table of constraint sets.

The stopwords table 114 includes keyword constraints 104. The stopwords table 114 may be utilized by the expansion module 30 to identify and remove keyword constraints 104 (e.g., and, the, is, etc.) from the query 100.

The keyword expansion table 116 includes keyword constraints 104 which, if found within a query 100, are substituted for an expression 136. The expression 136 includes both the original keyword constraint 104, an "OR" logical operator and an additional keyword constraint 104. The additional keyword constraint 104 may include alternate spellings, alternate word forms, synonyms, acronyms. For example, the keyword constraint 104 "book" may be expanded to include the expression ("book" OR "books").

The phrases table 118 includes keyword constraints 104 which, if found within a query 100, are substituted for the corresponding atomic expression 138. The expansion module 30 utilizes the phrases table 118 to recognize multiple keywords constraints 104 that should be treated as a single keyword constraint 104 or atomic expression. For example, a query 100 that includes the keyword constraints 104 "Harry" and "Potter" may be treated as a single constraint 102, "Harry Potter."

FIG. 7 is a block diagram illustrating a keyword cross type expansion table 140, a category cross type expansion table 142, search parameter cross type expansion table 144, and an attribute cross type expansion table 146. The keyword cross type expansion table 140 includes a keyword constraint 104 which corresponds to an expression that may include a keyword constraint 104 or a category constraint 110, or a search parameter constraint 108 or an attribute constraint 106. The keyword cross type expansion table 136 enables the expansion of a keyword constraint 104 to any of the other identified types of constraints 102. In addition, a keyword constraint 104 may be expanded to more than one category constraint 110 or more than one special parameter constraint 108 or more than one attribute constraint 106. The remaining expansion tables 142, 144, 146 are utilized to perform similar types of expansions for the other types of constraints 102. Thus any constraint type may be expanded to any other type constraint type and, further, any constraint type may be expanded to multiple constraints 102 of the same type.

Figure 8:
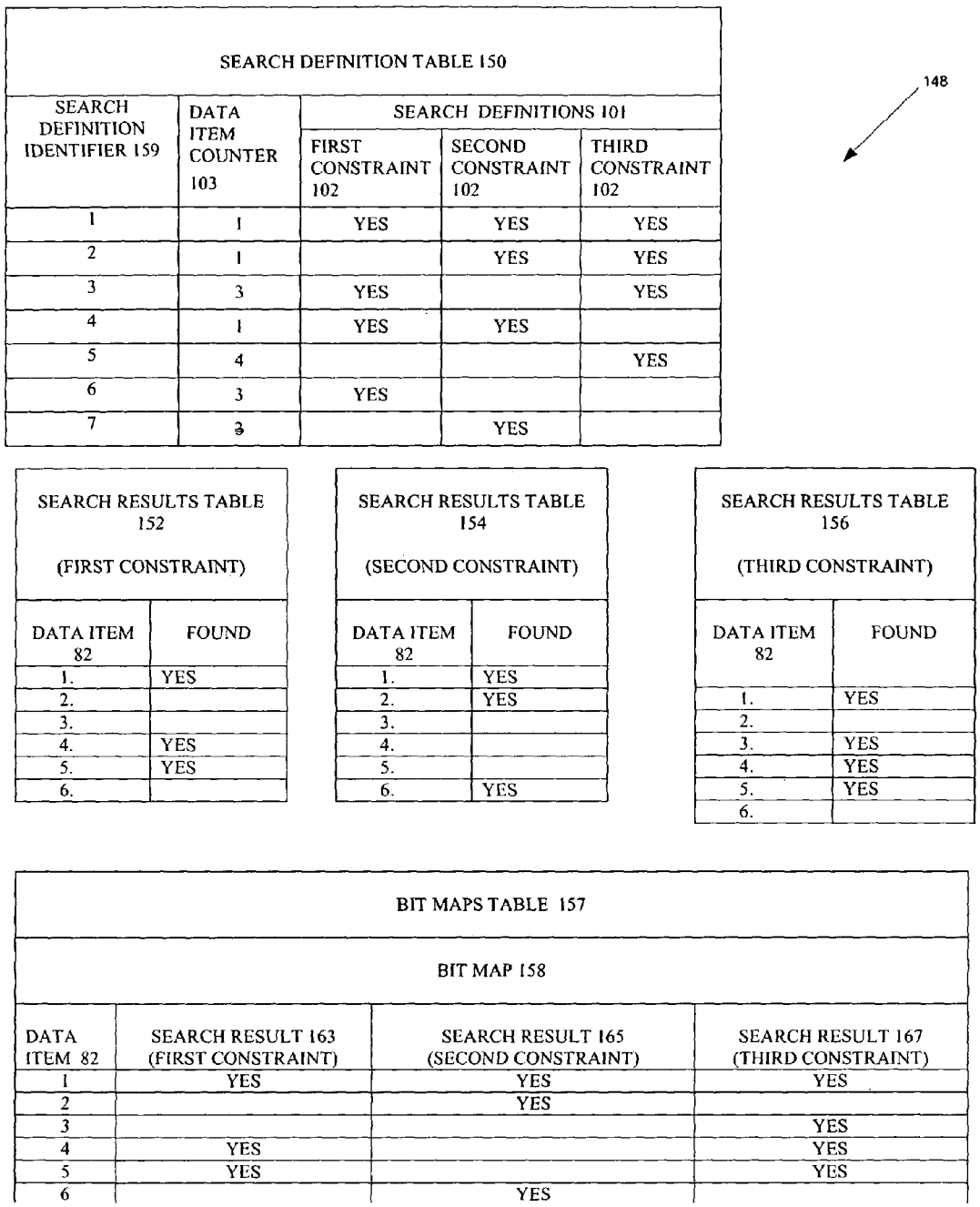
FIG. 8 is a block diagram illustrating search tables according to one embodiment, utilized to generate data item counters.

FIG. 8 is a block diagram illustrating search tables 148 according to one embodiment, utilized to generate data item counters 103. The search tables 148 include a search definition table 150, search result tables 152, 154, 156, and a bit map table 157 that includes bit maps 158. The search definition table 150 includes a search definition identifier 159 that may be associated with each search definition 101 and data item counter 103. The search definitions 101 or constraint sets are shown to systematically exclude all permutations of the three constraints 102. In one embodiment, each of the search definitions 101 may be executed against the data source 44 to determine the value of the respective data item counters 103. In another embodiment, the value of the data item counters 103 may be determined by executing a search for each constraint 102 in the search definitions 101 (e.g., FIRST CONSTRAINT 102, SECOND CONSTRAINT 102, THIRD CONSTRAINT 102) and performing calculations. In the present example, the first constraint 102 may be utilized to generate the search results table 152, the second constraint 102 may be utilized to generate the search results table 154 and the third constraint 102 may be utilized to generate the search results table 156. In the present example, the search results table 152 includes data items 82 one, four, and five and the search results table 154 includes data items 82 one, two, and six and the search results table 156 includes data items one, three, four, and five. The search results tables 152, 154, and 156 are utilized to generate bit maps 158 in the bit map table 157 for each of the data items 82. Each example bit map 158 includes a bit 163, 165, 167 that corresponds to the results of the respective example search results tables 152, 154, 156. Another example may include N search results tables 152, 154, 156, . . . N that may correspond to N bits in each bit map 158. An asserted bit may indicate the corresponding table 152, 154, 156 contains the data item 82. The bit maps 158 are utilized to increment data item counters 103 in the search definition table 150. For example, the data item counter 103 corresponding to the first search definition 101 may be incremented for each bit map that contains the value of "111" (e.g., data item 82 one). After all the bit maps 158 have been utilized to increment the appropriate data item counters 103 then data item counters 103 may be utilized to adjust the values of their respective subset data item counters 103. For example, the value of the data item counter 103 associated with the first search definition 101 may be utilized to adjust the value of data item counters 103 associated with the second, third, fourth, fifth, sixth and seventh search definitions 101. Accordingly, the data item counters 103 associated with the second, third, fourth, fifth, sixth and seventh search definitions are each incremented by the value contained in the data item counter 103 associated with the first search definition 101. The following table associates data item counters 103 in the search definition table 150 to their respective subset data item counters 103.

| DATA ITEM COUNTER 103 | SUBSET DATA ITEM COUNTERS 103 |
| --- | --- |
| 1 | 2, 3, 4, 5, 6, 7 |
| 2 | 5, 7 |
| 3 | 5, 6 |
| 4 | 6, 7 |
| 5 | |
| 6 | |
| 7 | |

Figure 9:
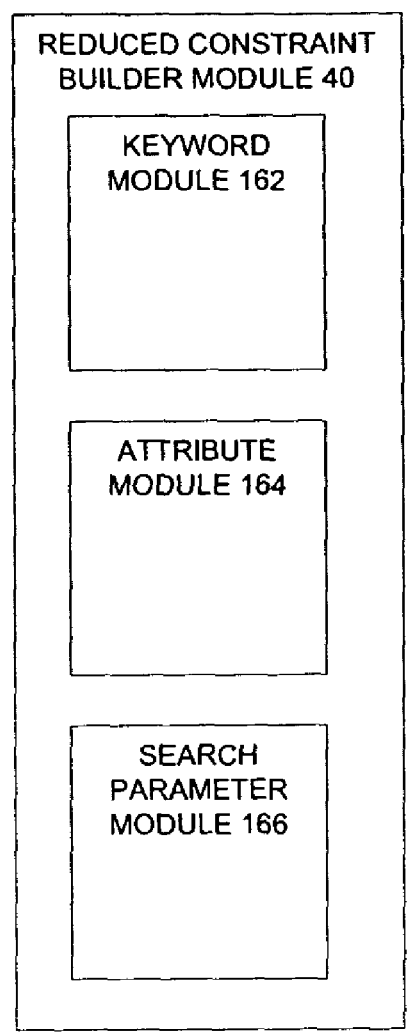
FIG. 9 is a block diagram of a reduced constraint builder module, according to one embodiment.

FIG. 9 is a block diagram of a reduced constraint builder module 40, according to one embodiment. The reduced constraint builder module 40 generates search definitions 101 based on the query 100. The reduced constraint builder module 40 includes a keyword module 162, an attribute module 164 and a search parameter module 166 each of which are invoked responsive to processing a single query 100 (e.g., a single data search request). The keyword module 162, attribute module 164 and search parameter module 166 may build search definitions 101 based on the query 100. The keyword module 162, attribute module 164, and search parameter module 166 may generate search definitions 101 that systematically remove constraints 102, as previously described.

Figure 10:
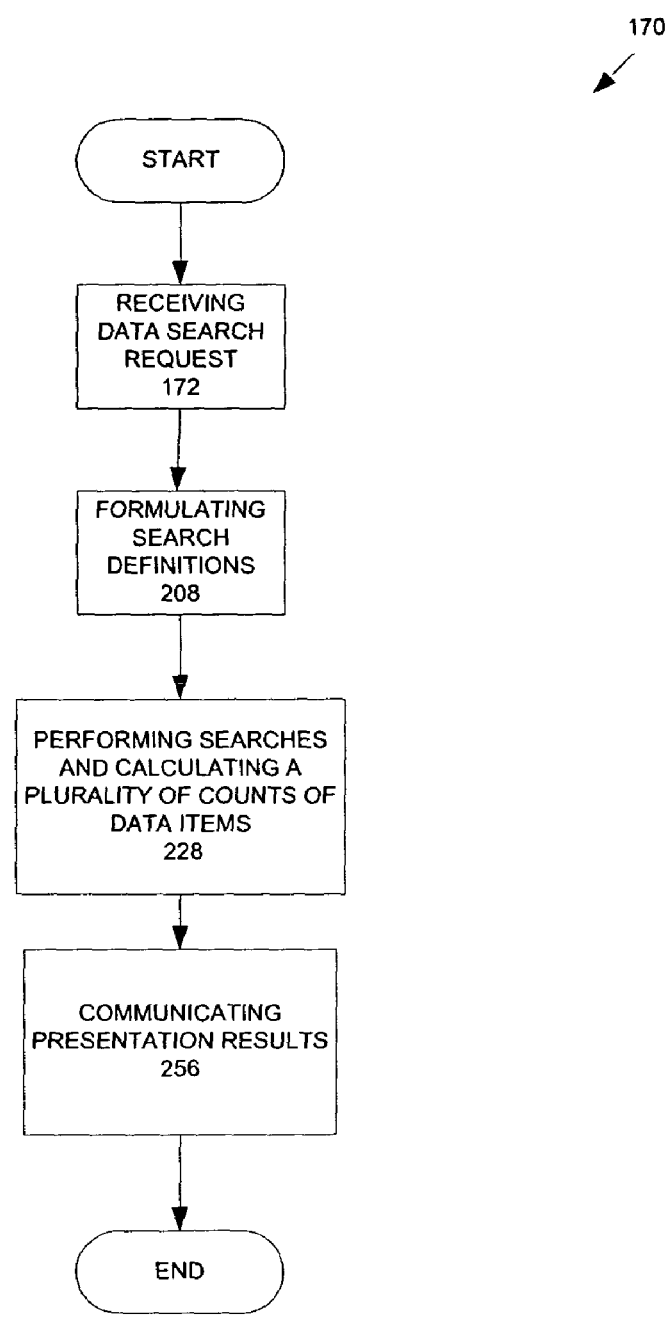
FIG. 10 is a flowchart illustrating a computer implemented method, according to one embodiment, to process a data search request.

FIG. 10 is a flowchart illustrating a computer implemented method 170, according to one embodiment, to process a data search request. The method 170 commences at operation 172 with the query controller module 32 receiving a data search request from a client machine 20.

Figure 11:
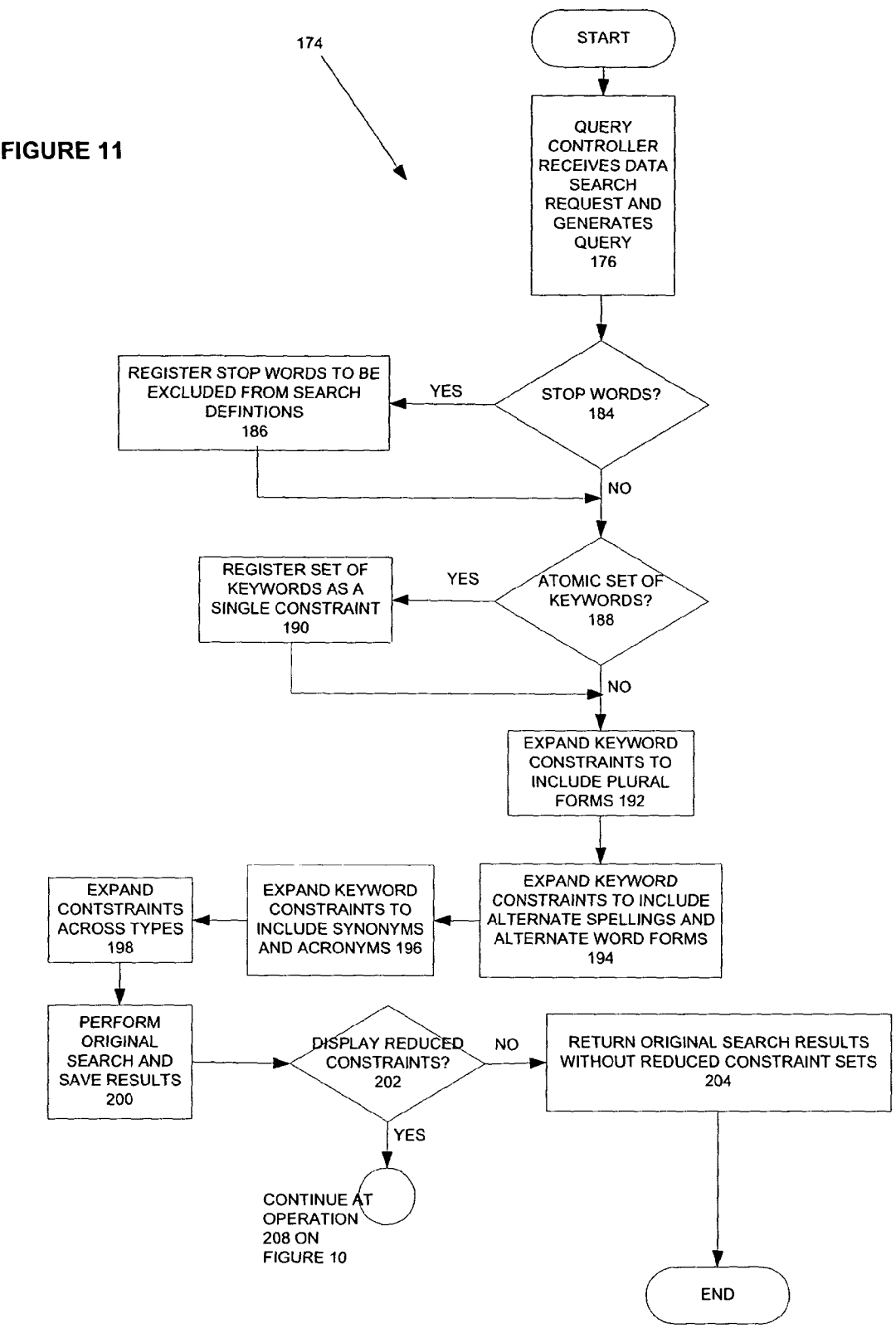
FIG. 11 is a flowchart illustrating a method to receive a data search request, according to one embodiment.
Figure 18:
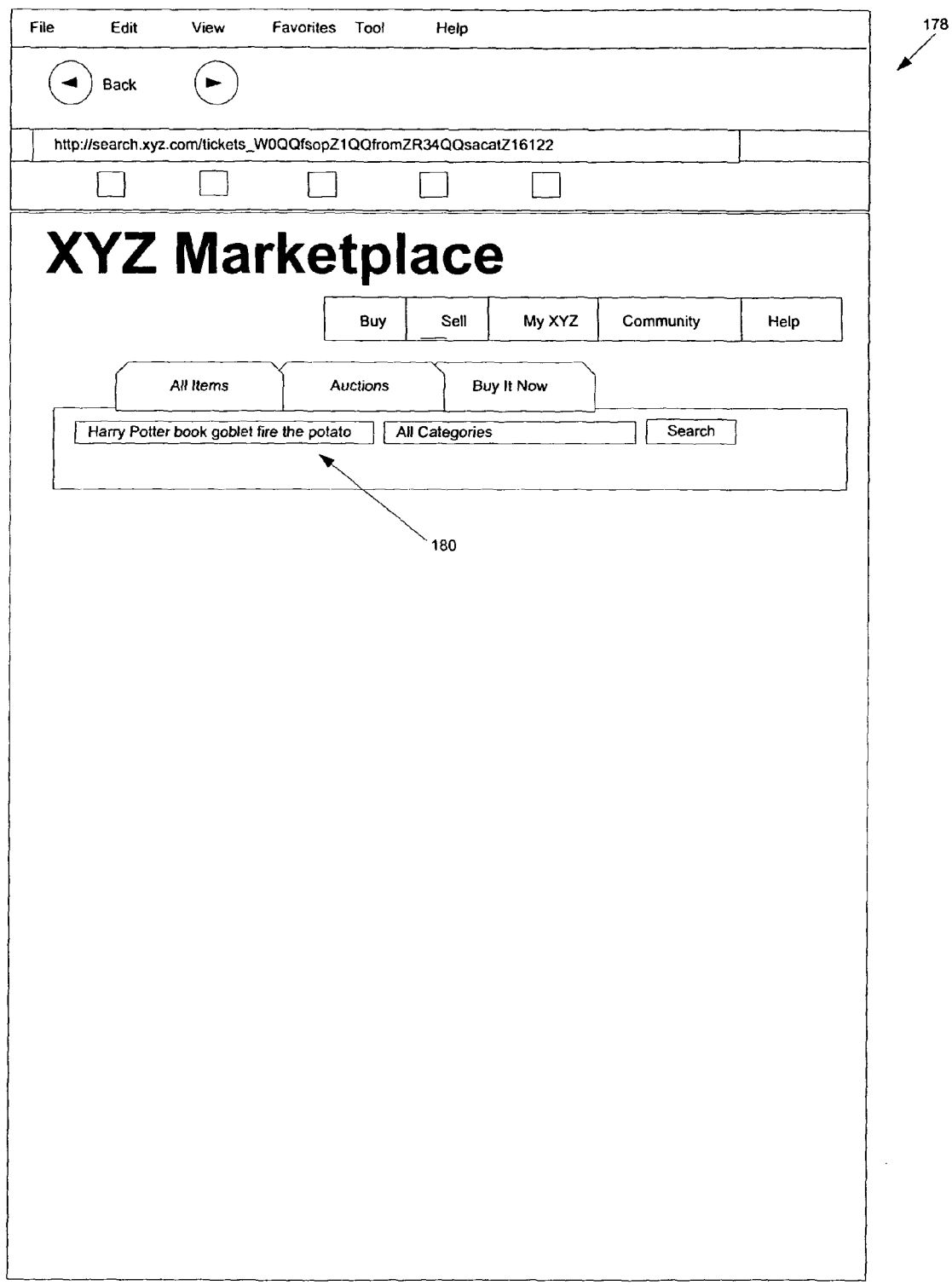
FIGS. 18-25 are representations of user interfaces, according to one embodiment.

FIG. 11 illustrates a method 174 to receive a data search request, according to one embodiment. At operation 176, the query controller module 32 receives the data search request which may be entered by a user at the client machine 20. FIG. 18 is an illustration of a user interface 178, according to an embodiment, that may be utilized to receive a keyword data search request. The user interface 178 includes a dialogue box 180 to receive keywords constraints 104. The dialogue box 180 is illustrated as receiving the keyword constraints 104 "Harry", "Potter", "book", "goblet", "fire", "the", and "potato." Returning to FIG. 11, at operation 176, the query controller module 32 generates a query 100 based on the data search request and communicates the query 100 to the expansion module 30.

At decision operation 184, the expansion module 30 utilizes the stopwords table 114 to identify keyword constraints 104 contained in the query 100. In the present example, a match on the keyword constraint 104 "the" may be identified and a branch would be made to operation 186. Otherwise a branch is made to decision operation 188. At operation 186, the expansion module 30 registers keyword constraints 104 that may be excluded from search definitions 101. In the present example the word "the" may be identified to be excluded from search definitions 101.

At decision operation 188, the expansion module 30 utilizes the phrases table 118 to determine if one or more predetermined sets of keyword constraints 104 may be identified in the query 100. If one or more predetermined sets of keyword constraints 104 may be identified then a branch is made operation 190. Otherwise a branch is made to operation 192. In the present example, the expansion module 30 may determine that the query 100 includes the predetermined set of keyword constraints 104 "Harry" and "Potter" and branch to operation 190.

At operation 190, the expansion module 30 registers the two keyword constraints 104 as a single atomic constraint 138 (e.g. "Harry Potter").

At operation 192, the expansion module 30 utilizes the keywords expansion table 116 to expand the keyword constraints 104 in the query 100. In the present example, the keyword constraint 104 "book" may be identified in the keyword expansion table 116 and expanded to an expression that includes the word "books" (e.g., expression=(book OR books)).

At operation 194, the expansion module 30 utilizes the keyword expansion table 116 to identify keyword constraints 104 in the query 100 that may be associated with alternate spellings or alternate word forms. If keyword constraints 104 are found, then an expression may be added to the query that includes the original and alternate form.

At operation 196, the expansion module 30 utilizes the keywords expansion table 116 to identify keyword constraints 104 in the query 100 that may be associated with synonyms and acronyms. If keyword constraints 104 are found, then expressions may be added to the query 100 that may include the original keyword constraint 104 and synonym or acronym keyword constraints 104.

At operation 198, the expansion module 30 utilizes the appropriate cross type expansion table 140, 142, 144, 146 to identify constraints 102 that may be mapped to other types of constraints, as previously described. In the present example, the expansion module 30 may utilize the keyword cross type expansion table 140 to determine if any of the keyword constraints 104 in the query 100 may be mapped to one or more attribute constraints 104, one or more search parameter constraints 108, or one or more category constraints 110 and if so, substituting the appropriate expression from the keyword cross type expansion table 140.

At operation 200, the expansion module 30 communicates the modified query 100 to the query controller module 32 which, in turn, communicates the modified query 100 to the search engine 42 which, in turn, executes the modified query 100 against the data source 44. The search engine 42 returns a result list to the query controller module 32 which, in turn, communicates the result list to the query builder module 38.

At decision operation 202, the query builder module 38 determines if presentation results in the form of search definitions 101 with reduced constraints and data item counts 103 that correspond to the search definitions 101 may be presented to the user with the original result set. If the presentation results may be presented then processing continues at operation 208 on FIG. 10. Otherwise a branch is made to operation 204.

At operation 204, the query builder module 38 returns the original search results to the query controller module 32 which, in turn, generates and communicates the appropriate HTML back to the client machine 20 for presentation to the user.

Returning to FIG. 10, at operation 208, the reduced constraint builder module 40 formulates search definitions.

Figure 14:
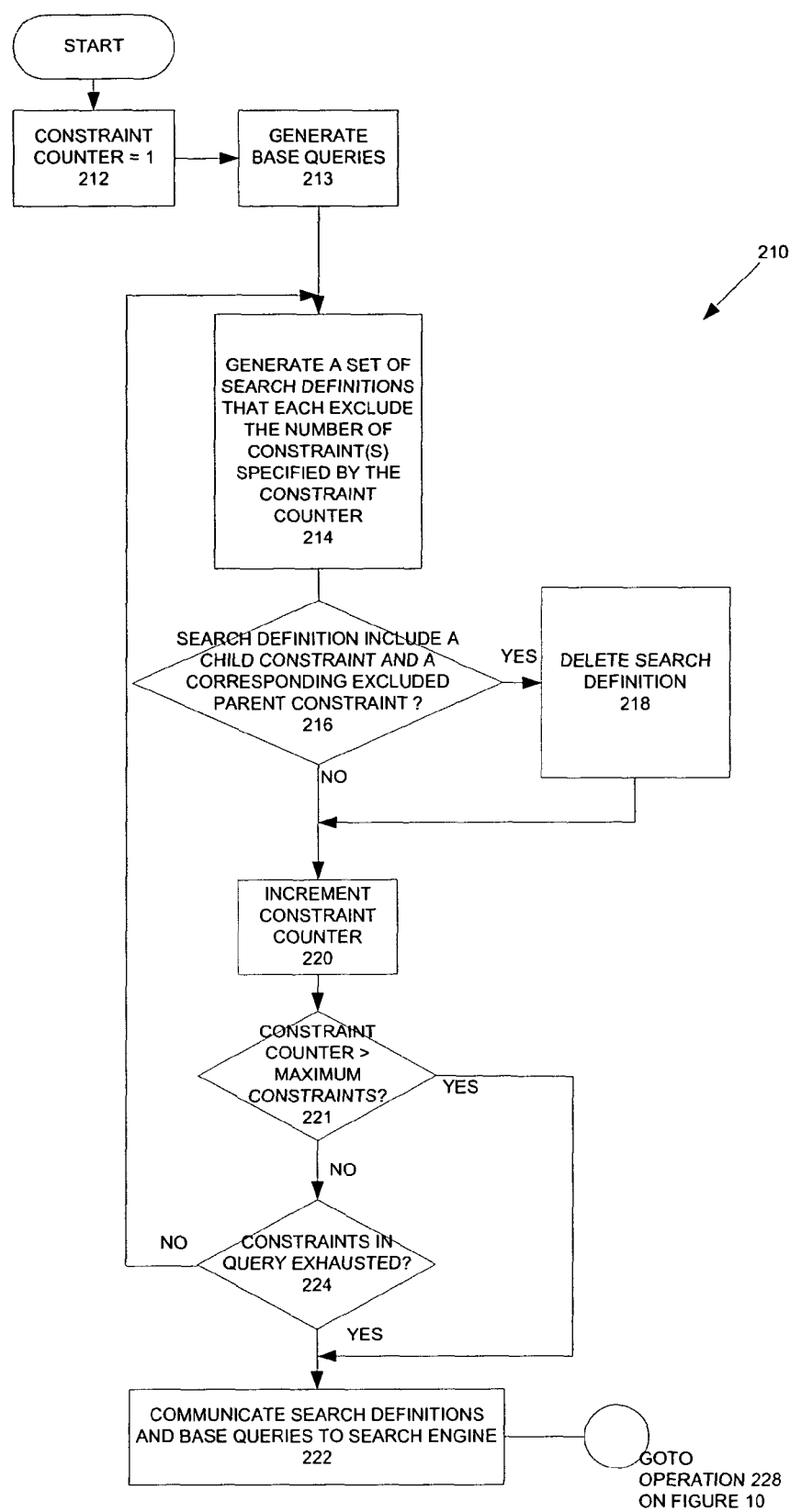
FIG. 14 is a flowchart illustrating a method to formulate search definitions, according to one embodiment.

FIG. 14 is a flowchart illustrating a method 210 to formulate search definitions, according to one embodiment. The method 210 commences at operation 212 with the reduced constraint builder module 40 setting a constraint counter to one.

At operation 213 the reduced constraint builder module 40 invokes the keyword module 162 if keyword constraints 104 are present in the query 100, the attribute module 164 if attribute constraints 106 are present in the query 100, and the search parameter module 166 if search parameter constraints 108 are present in the query. Each of the respective modules 162, 164, 166 may generate base queries 111, as previously described. Base queries 111 may be generated based on constraints 102 in the query 100 that are different from the named module 162, 164, 166. For example, the keyword module 162 may not build base queries 111 in response to receiving a query 100 that includes only keyword constraints 104.

At operation 214, the reduced constraint builder module 40 invokes the keyword module 162 if keyword constraints 104 are present in the query 100, the attribute module 164 if attribute constraints 106 a present in the query 100, and the search parameter module 166 if search constraints 108 are present in the query. Each of the respective modules 162, 164, 166 generate a set of search definitions 101 that excludes the number of constraints 102 specified by the constraint counter. For example, if the constraint counter equals one, then search definitions 101 are generated with a single excluded constraint.

At decision operation 216, the reduced constraint builder module 40 determines if a generated search definition 101 includes child constraint 102 and an excluded corresponding parent constraint 102 For example, consider a search definition 101 that includes the child constraint 102 "San Jose" and excludes the corresponding parent constraint 102 "California" If a generated search definition 101 includes a child constraint and excludes a corresponding parent constraint 102 then a branch is made to operation 218. Otherwise, a branch is made to operation 220.

At operation 218, the reduced constraint builder module 40 deletes the search definition 101. At operation 220, the reduced constraint builder module 40 increments the constraint counter.

At decision operation 222, the reduced constraint builder module 40 determines if the constraint counter is greater than the maximum number of constraints 122 as specified in the configuration table 112. If the constraint counter is greater than the maximum number of constraints 122, then a branch is made to operation 222. Otherwise a branch is made to decision operation 224.

At decision operation 224, the reduced constraint builder module 40 determines if the constraints 102 in the query 100 are exhausted. If the constraints 102 are exhausted, then a branch is made to operation 222 otherwise a branch is made to operation 214.

At operation 222, the reduced constraint builder module 40 communicates the search definitions 101 and corresponding base queries 111 to the search engine 42 and processing continues on FIG. 10 at operation 228.

Returning to FIG. 10, at operation 228, the search engine 42 performs searches and calculates counts of data items.

Figure 15:
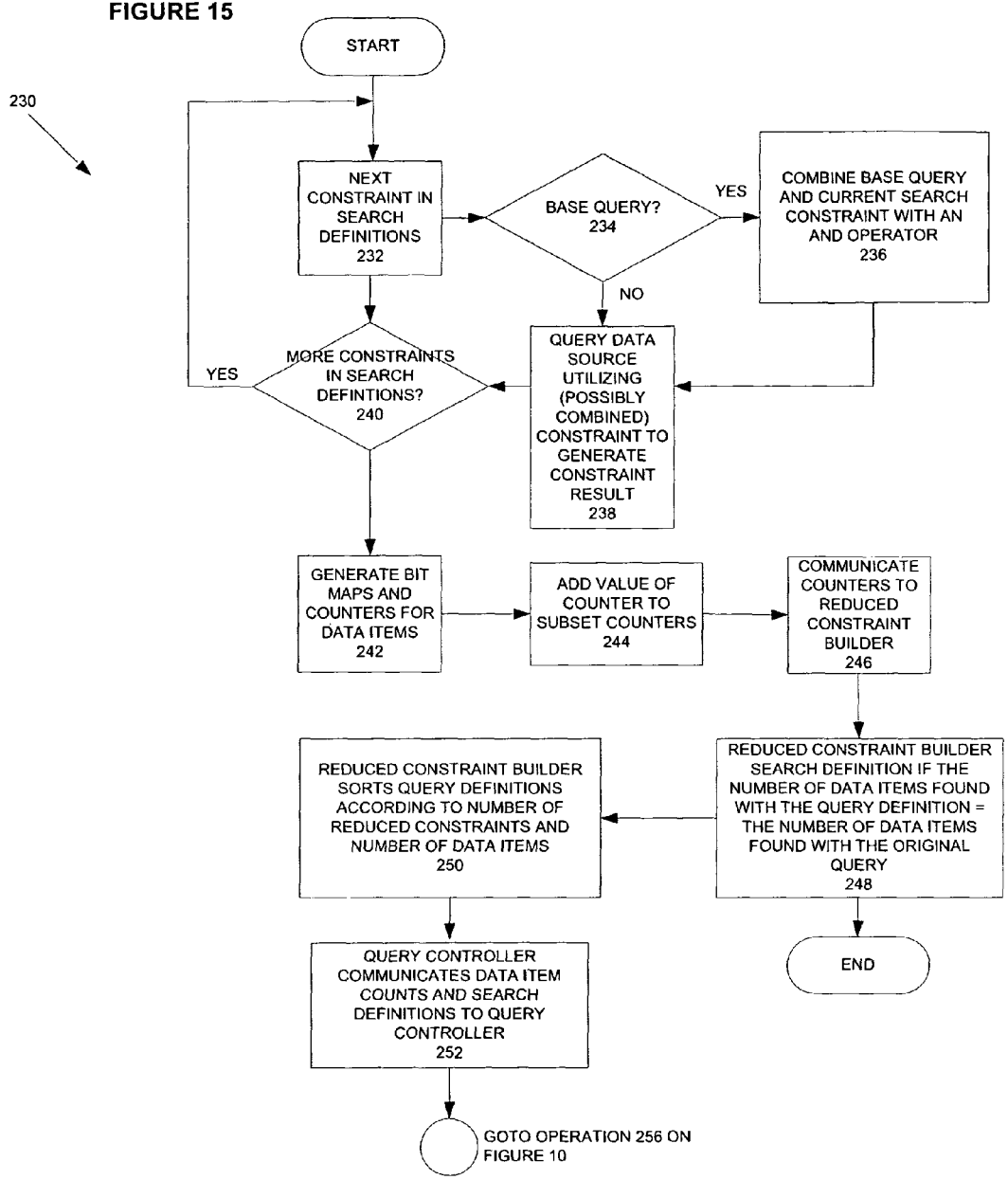
FIG. 15 is a flowchart illustrating a method, according to one embodiment, to perform searches and calculate counts of data items, according to one embodiment.

FIG. 15 is a flowchart illustrating a method 230, according to one embodiment, to perform searches and calculate counts of data items in the form of data item counters 103, according to one embodiment. The method 230 may be performed for keyword constraints 104, attribute constraints 106, and search parameters constraints 108. For simplicity sake the method 230 will be described with respect to keyword constraints 104; however, it will be appreciated that the following description may also apply to attribute constraints 106, and search parameter constraints 108. The method 230 commences at operation 232 where the search engine 42 gets the first constraint 102 in the keyword search definition 101.

At decision operation 234, the search engine 42 determines if there is a base query 111. If there is a base query 111 then a branch is made to operation 236, otherwise a branch is made to operation 238. The present example includes only keywords constraints 104 therefore it is not associated with a base query 111.

At operation 236, the search engine 42 combines the base query 111 and the current search constraint 102 with an "AND" operator.

At operation 238, the search engine 42 queries the data source utilizing the constraint 102 and possibly the base query 111 to generate a constraint result.

At decision operation 240, the search engine 42 determines if there are more keyword constraints 104 in the search definition 101. If there are more keyword constraints 104 in the search definition 101 then a branch is made to operation 232. Otherwise a branch is made to operation 242.

At operations 242 and 244, the search engine 42 generates bit maps 158 for data items 82 in the constraint results, increments data item counters 103 based on the bit maps 158, and adds the values of the data item counters 103 to subsets of the respective data item counters 103. In sum, operations 242 and 244 describe the generation of the data item counters 103 associated with each of the search definitions 101. Operations 242 and 244 are more fully described on FIG. 16 and FIG. 17.

At operation 246, the search engine 42 communicates the data item counters 103 to the reduced constraint builder module 40.

At operation 248, the reduced constraint builder module 40 excludes search definitions 101 that correspond to a data item counter 103 that may equal the number of data items 82 found with the original query. In other words, a search definition 101 may not be returned to a user that does not improve the over constrained condition (e.g., increase the number of data items 82 found).

At operation 250, the reduced constraint builder module 40 sorts the search definitions 101 and corresponding data item counters 103 according to the type of reduced constraints (e.g., search parameter constraints 108, keyword constraints 104, and attribute constraints 106), the number of excluded constraints 102, and the value of the data item counters 103. For example, search parameter reduced constraints 106 may appear first followed by keyword reduced constraints 104 followed by attribute reduced constraints 105 each according to an ascending number of excluded constraints, the same number of excluded constraints according to data items counters 161 with ascending values.

At operation 252, the reduced constraint builder module 40 communicates the search definitions 101 and the data item counters 103 to the query controller module 32 and processing continues on FIG. 10 at operation 256.

Figure 19:
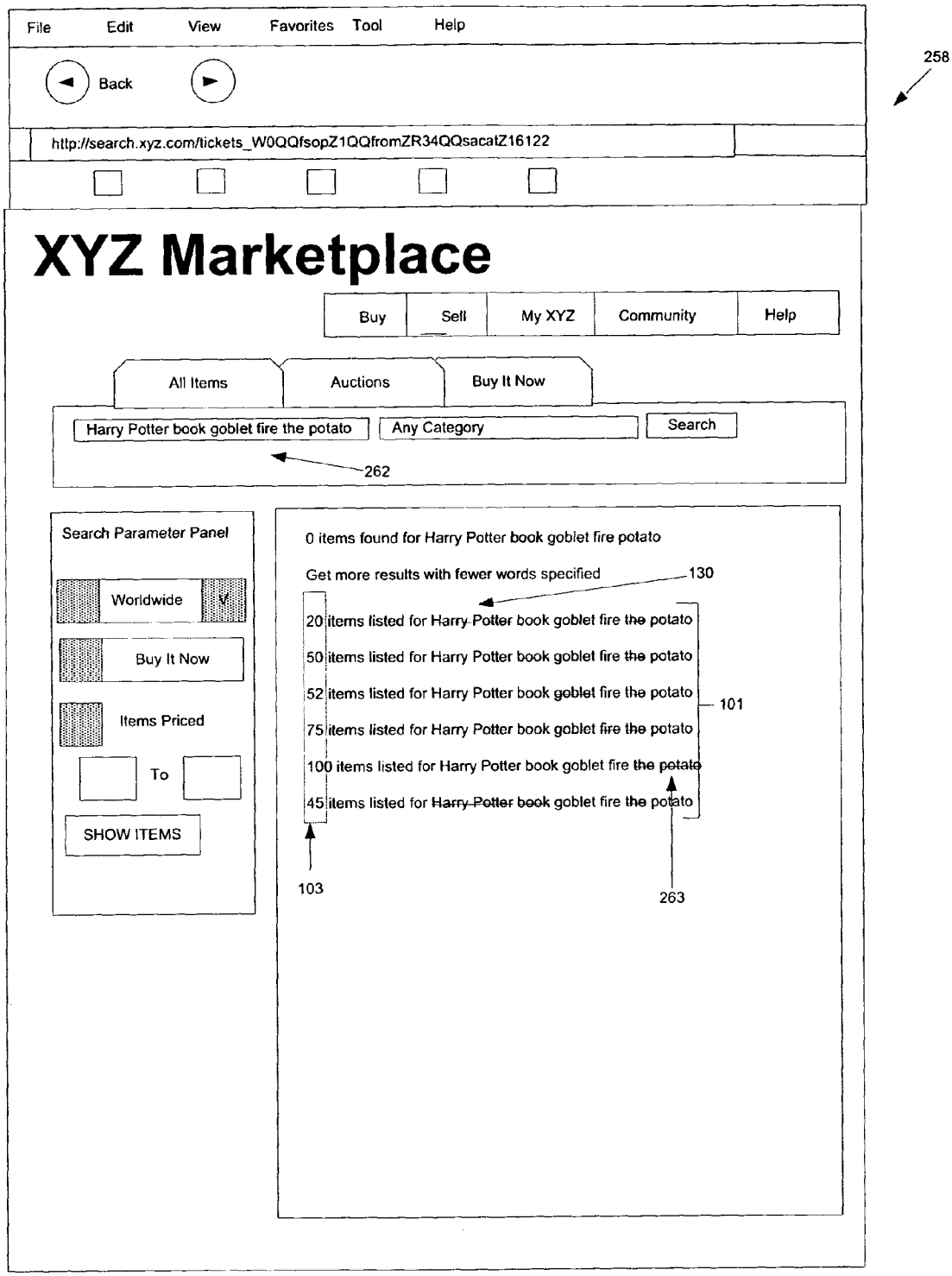

Returning to FIG. 10, at operation 256, the query controller module 32 utilizes the original search results and the presentation results in the form of the search definitions 101 and the data item counters 103 to generate HTML that, in turn, is communicated in the form of a user interface to the client machine 20. FIG. 19 illustrates a user interface 258, according to one embodiment. The user interface 258 includes a dialogue box 262, search definitions 101, and data item counters 103. It will be appreciated that the dialogue box 262 is shown to include the word "the" which is illustrated as excluded from the search definitions 101 (e.g., a stopword). The search definitions 101 appear as a list of constraint sets and are sorted according to the number of constraints excluded and the number of data items 82 associated with corresponding search definition 101. The search definitions 101 also include an atomic constraint 138 in the form of "Harry Potter" which appears as a single keyword constraint 104 (e.g., the words "Harry" and "Potter" may always be excluded together " Harry Potter " In one embodiment, the user at the client machine 20 may select any of the search definitions 101 to list the data items 82 that may be found based on the search definition 101. For example, a user may select a search definition 263, "Harry Potter book goblet fire."

Figure 20:
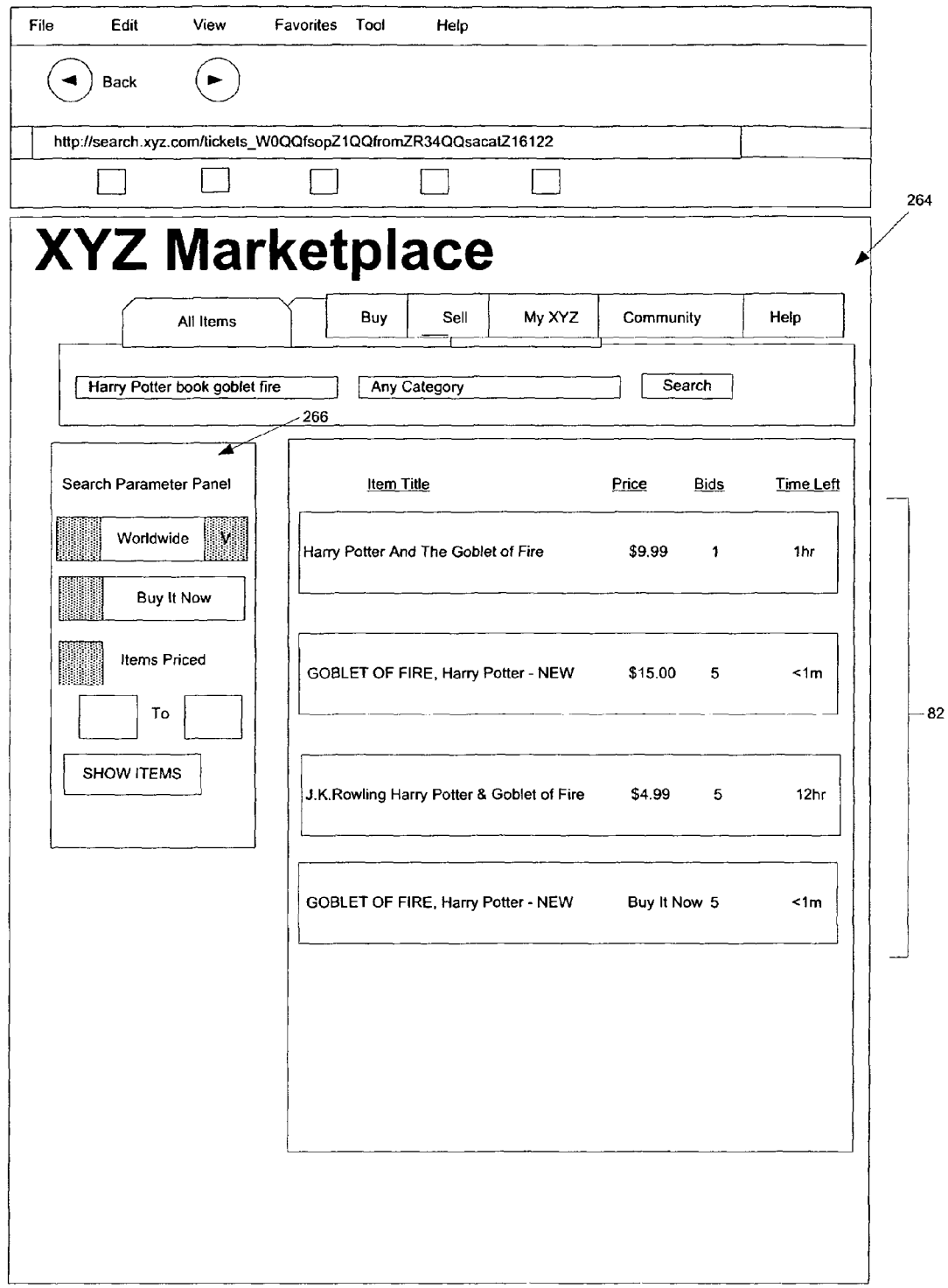

FIG. 20 illustrates a user interface 264, according to one embodiment, illustrating the results of the selection of the search definition 263. The user interface 264 includes data items 82 and a search parameter panel 266. The data items 82 were found responsive to the user selecting a search definition 101 that included the keyword constraints 104 "Harry Potter book goblet fire." The search parameter panel 266 includes controls that may be utilized by the user to further filter the data items 82 that appear on the user interface 264.

Figure 21:
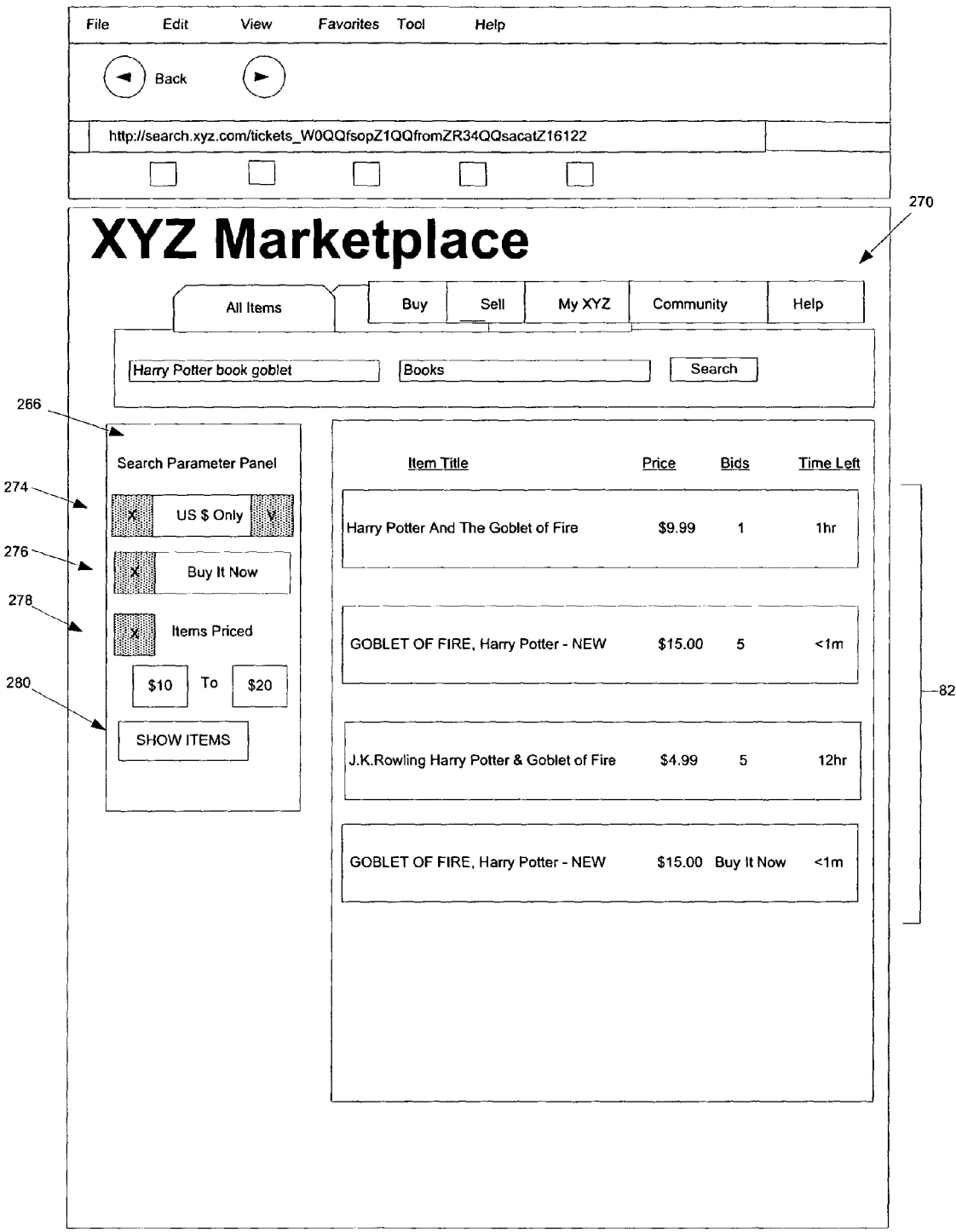

FIG. 21 is a user interface 270, according to one embodiment, to select search parameters constraints 108 by utilizing a search parameter panel 266. The search parameter panel 266 includes a currency search parameter 274, a purchase format parameter 276, a price parameter 278, and a show items button 280. The example selections illustrated on the search parameter panel 266 indicate that the user has requested to filter data items 82 found with the keyword constraints "Harry Potter book goblet" to a subset of data items 82 that may be traded in US Dollars, purchased immediately (e.g., "Buy It Now") and priced from $10 to $20. Accordingly, the user at the client machine 20 selects the show items button 280 thereby triggering processing previously described by the method 170 on FIG. 10.

Figure 22:
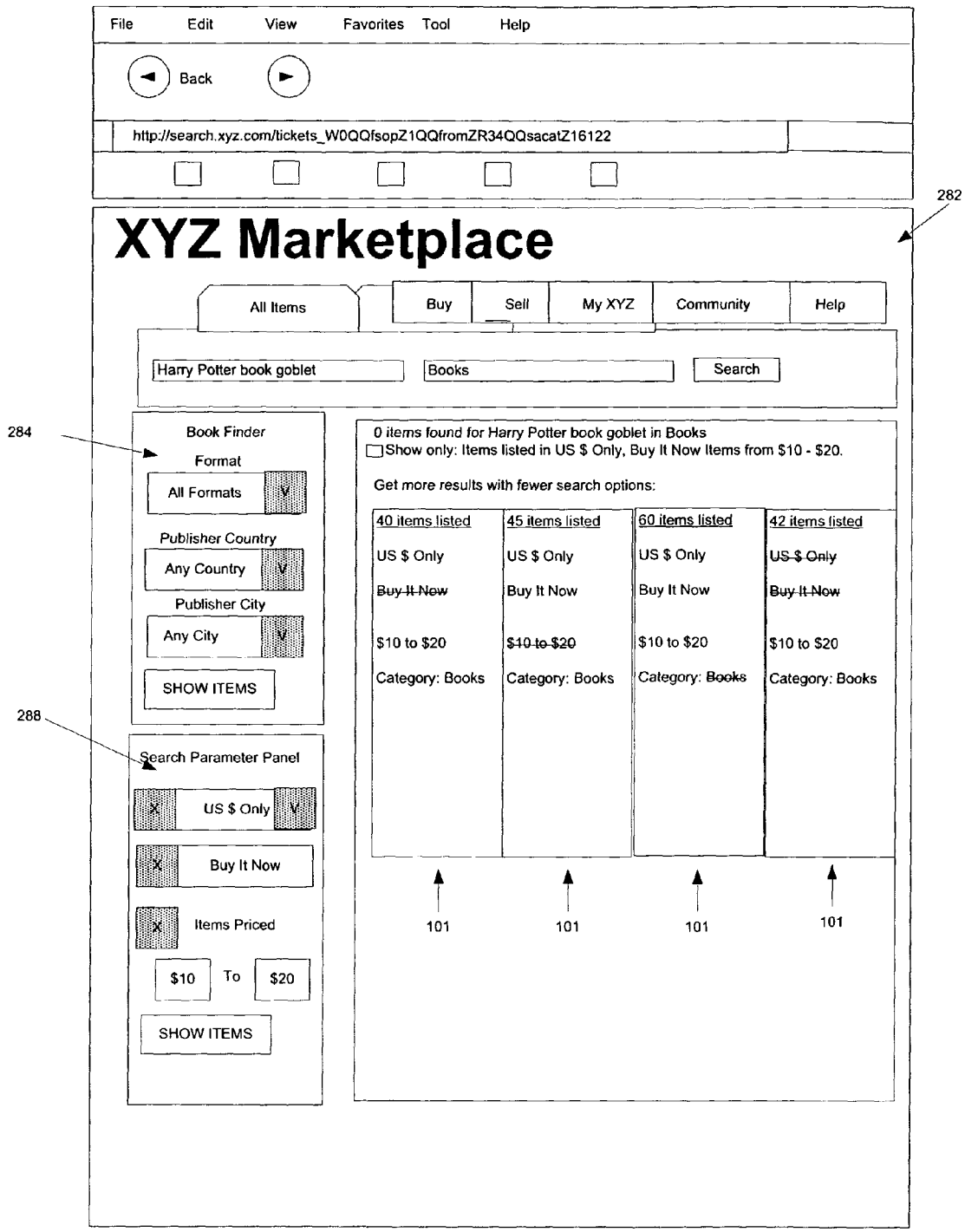

FIG. 22 is a user interface 282, according to an example embodiment of the present invention, illustrating search definitions 101 that exclude search parameter constraints 108. User interface 282 includes search definitions 101 that exclude search parameter constraints 108, a book finder 284 and a search parameter panel 288. The search definitions 101 appear as a table of constraint sets with each column corresponding to a search definition 101. It will be appreciated that the search definition 101 that excludes the single search parameter constraint 108 "US $ Only" does not appear on the user interface 282 thereby illustrating the exclusion of a search definition 101 that is not associated with a count of data items 82 greater than the number of data items 82 found with the original search. The book finder 284 may be utilized by the user to further filter on attributes constraints 106 of data items 82 in the domain 84 "books."

Figure 23:
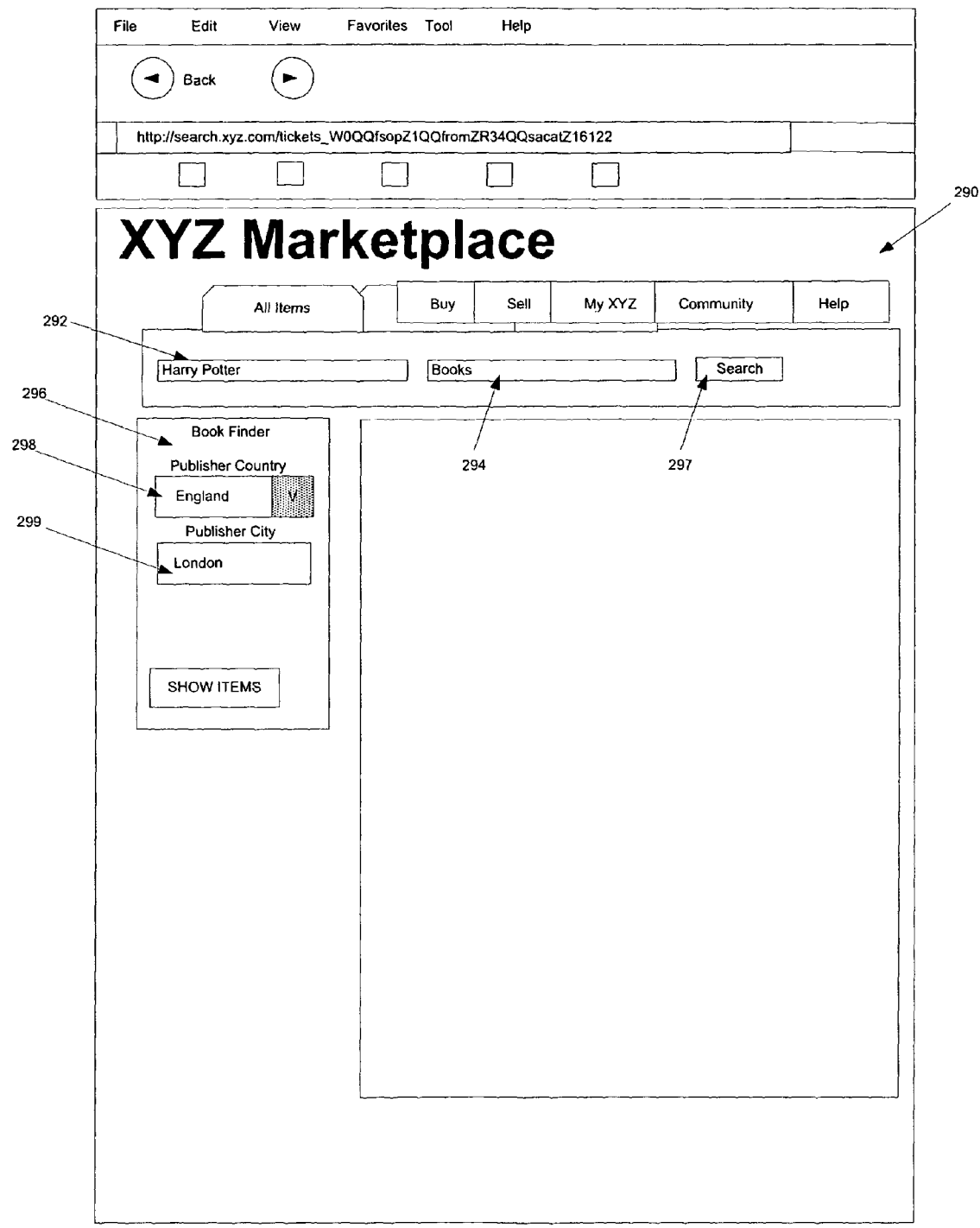

FIG. 23 illustrates a user interface 290, according to one embodiment, to find data items 82. The user interface 290 includes a category identifier 294, a keyword input box 292, and a book finder 296, and a search button 297. The category identifier 294 illustrates a selection of the category "Books,"

a search parameter constraint 108. The keyword input box 292 illustrates that the user has input "Harry" and "Potter" keyword constraints 104. The book finder 296 illustrates that the user has selected a parent attribute 298, (e.g., Publisher Country—England) and a child attribute 299, (e.g., Publisher City—London), attribute constraints 106. Finally, the user at the client machine 20 selects the search button 297 thereby triggering processing previously described by the method 170 on FIG. 10.

Figure 24:
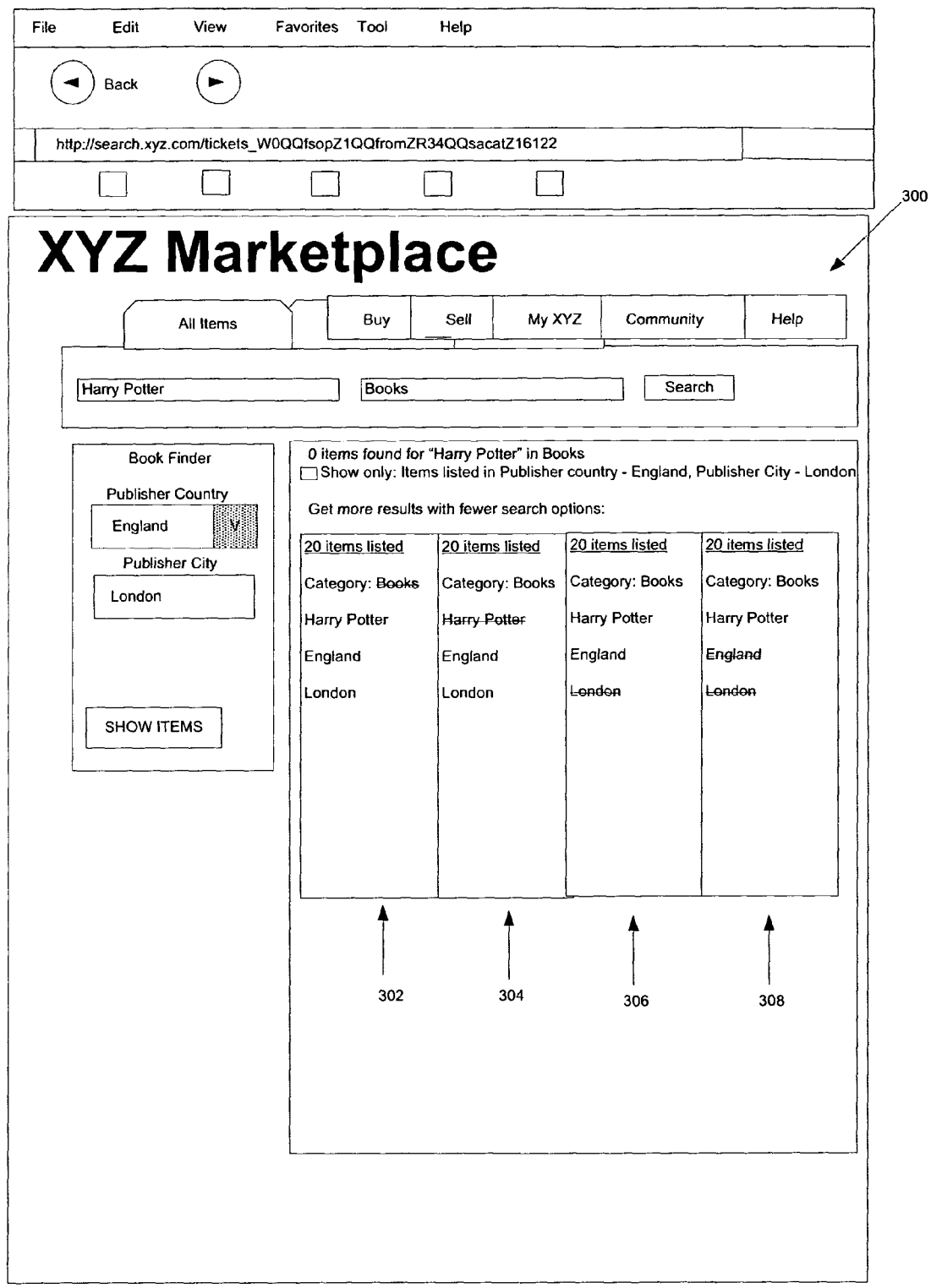

FIG. 24 illustrates a user interface 300, according to one embodiment, to display search definitions 101 that exclude constraints of mixed constraint types. The user interface 300 includes search definitions 302, 304, 306 and 308 which are presented as sorted according to constraint types. For example, the search definition 302 excludes a search parameter constraint 108 (e.g., Category: Books ), the search definition 304 excludes an atomic keyword constraint 104 (e.g., Harry Potter ), and the search definitions 306 and 308 both exclude attribute constraints 106 (e.g., London and England , London ). Further, the search definitions 306 illustrate a parent child relationship between the attribute constraints 106 "Publisher Country" and "Publisher City." For example, a search definition that excludes England and includes "London" is not presented.

Expanding a Constraint Across Types

Figure 12:
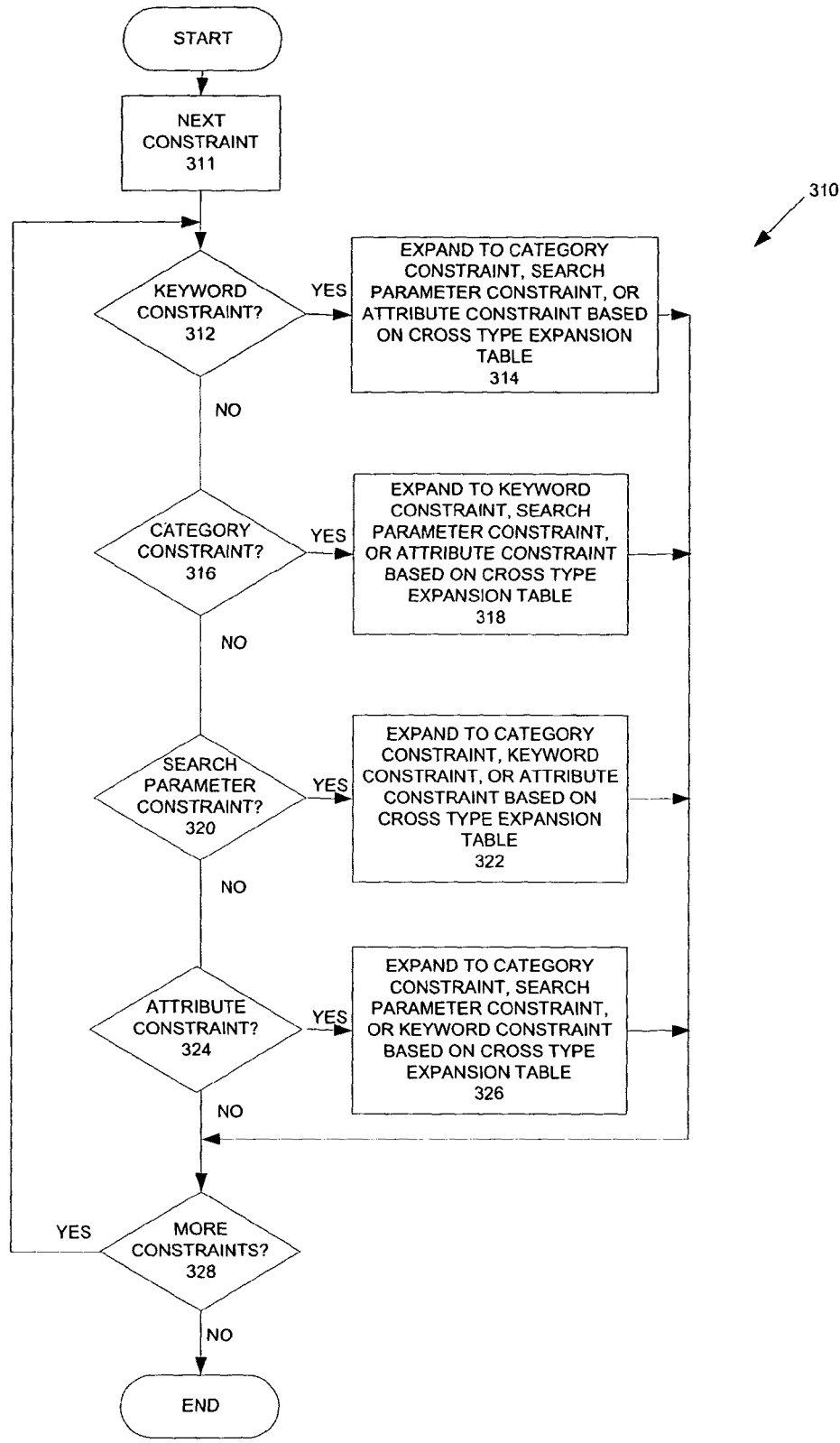
FIG. 12 is a flowchart illustrating a method, according to one embodiment, to expand a constraint across types.

FIG. 12 is a method 310, according to one embodiment, to expand a constraint across types. The method 310 commences at operation 311 where the expansion module 30 gets the next constraint from the query 100.

At decision operation 312, the expansion module 30 parses the query 100 and determines if the first constraint 102 is a keyword constraint 104. If the first constraint 102 is a keyword constraint 104 then a branch is made to operation 314. Otherwise a branch is made to decision operation 316. At operation 314, the expansion module 30 utilizes the keyword cross type expansion table 140 to form an expression that "OR"s the keyword constraint 104 to other type(s) of constraint(s) 102. For example, the keyword constraint 104 may be included in an expression that includes zero, one, or multiple category constraints 110, zero, one, or multiple search parameter constraints 108, and zero, one, or multiple attribute constraints 106.

At decision operation 316, the expansion module 30 determines if the constraint 102 is a category constraint 110. If the constraint 102 is a category constraint 110 then a branch is made to operation 318. Otherwise a branch is made to decision operation 320. At operation 318, the expansion module 30 utilizes the category cross type expansion table 142 to form an expression that "OR"s the category constraint 110 to other type(s) of constraint(s) 102. For example, the category constraint 110 may be included in an expression that includes zero, one, or multiple keyword constraints 104, zero, one, or multiple search parameter constraints 108, and zero, one, or multiple attribute constraints 106.

At decision operation 320, the expansion module 30 determines if the constraint 102 is a search parameter constraint 108. If the constraint 102 is a search parameter constraint 108 then a branch is made to operation 322. Otherwise a branch is made to decision operation 324. At operation 322, the expansion module 30 utilizes the search parameter cross type expansion table 144 to form an expression that "OR"s the search parameter constraint 108 to other type(s) of constraint(s) 102. For example, the search parameter constraint 108 may be included in an expression that includes zero, one, or multiple category constraints 110, zero, one, or multiple keyword constraints 104, and zero, one, or multiple attribute constraints 106.

At decision operation 324, the expansion module 30 determines if the constraint 102 is an attribute constraint 106. If the constraint 102 is an attribute constraint 106 then a branch is made to operation 326. Otherwise a branch is made to decision operation 328. At operation 326, the expansion module 30 utilizes the attribute cross type expansion table 146 to form an expression that "OR"s the attribute constraint 106 to other type(s) of constraint(s) 102. For example, the attribute constraint 106 may be included in an expression that includes zero, one, or multiple category constraints 110, zero, one, or multiple search parameter constraints 108, and zero, one, or multiple keyword constraints 104.

At decision operation 328, the expansion module 30 determines if there are more constraints 102. If there are more constraints 102 then a branch is made to decision operation 312. Otherwise processing ends.

Figure 13:
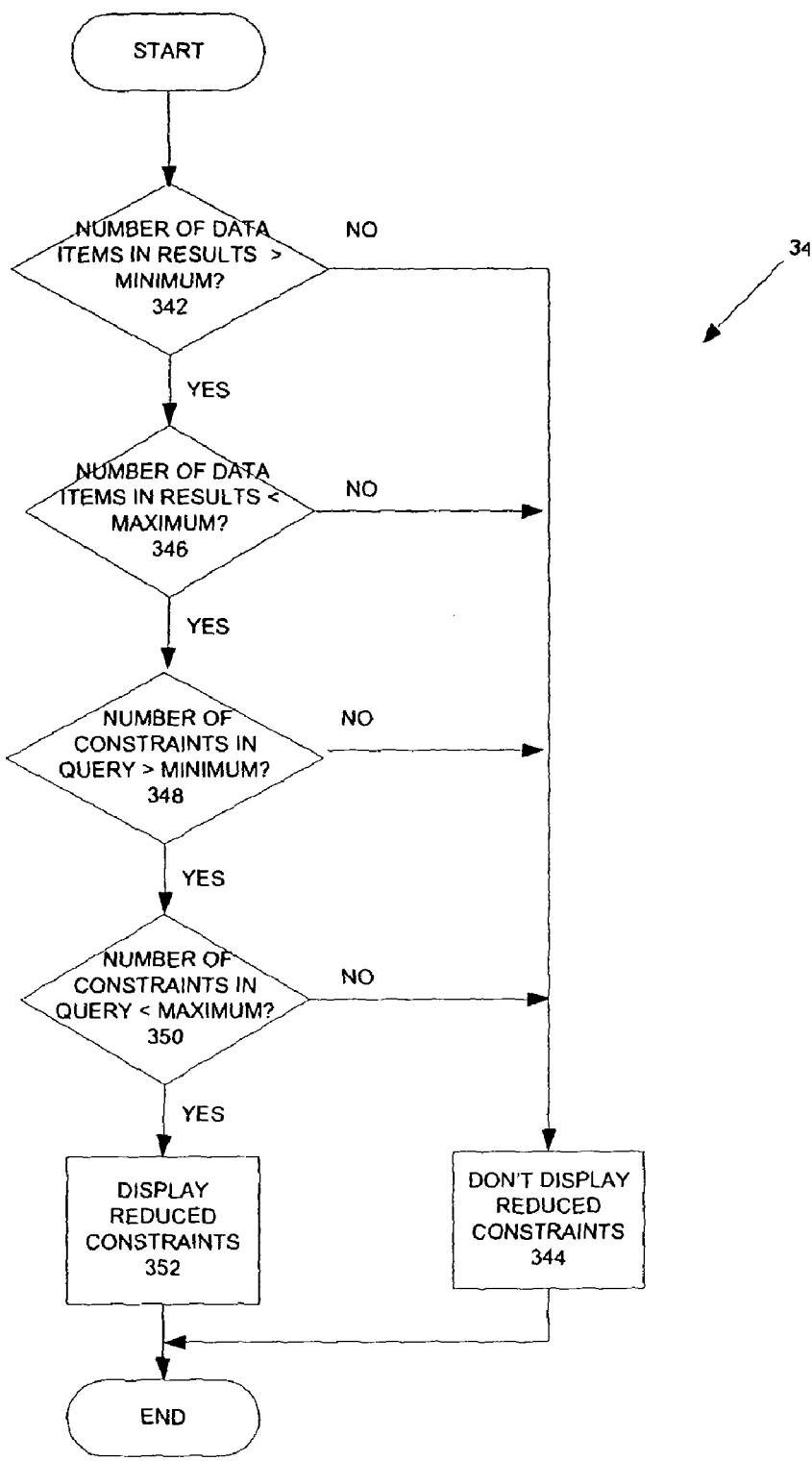
FIG. 13 is a flowchart illustrating a method, according to one embodiment, to determine if reduced constraints are presented to the user.

FIG. 13 illustrates a method 340, according to one embodiment, to determine if reduced constraints are presented to the user. The method 340 commences at decision operation 342 where the query builder module 38 determines if the number of data items 82 in the results from the original query 100 may be greater than the minimum data items 124 in the configuration table 112. If the number of data items may not be greater then a branch is made to operation 344. Otherwise a branch is made to decision operation 346.

At decision operation 346, the query builder module 38 determines if the number of data items 82 in the original results may be less than the maximum data items 126 in the configuration table 112. If the number of data items may not be less than the maximum data items 126 then a branch is made to operation 344. Otherwise a branch is made to decision operation 348.

At decision operation 348, the query builder module 38 determines if the number of constraints 102 in the query 100 may be greater than minimum constraints 120 in the configuration table 112. If the number of constraints 102 may not be greater than the minimum then a branch is made to operation 344. Otherwise a branch is made to decision operation 350.

At decision operation 350, the query builder module 38 determines if the number of constraints 102 in the query 100 may not be less than the maximum constraints 122 in the configuration table 112. If the number of constraints 102 may not be less than the maximum constraints 122 then a branch is made to operation 344. Otherwise a branch is made to operation 352.

At operation 352, the method signals the presentation of reduced constraints 102 and at operation 344 the method signals not to present reduced constraints 102.

Figure 16:
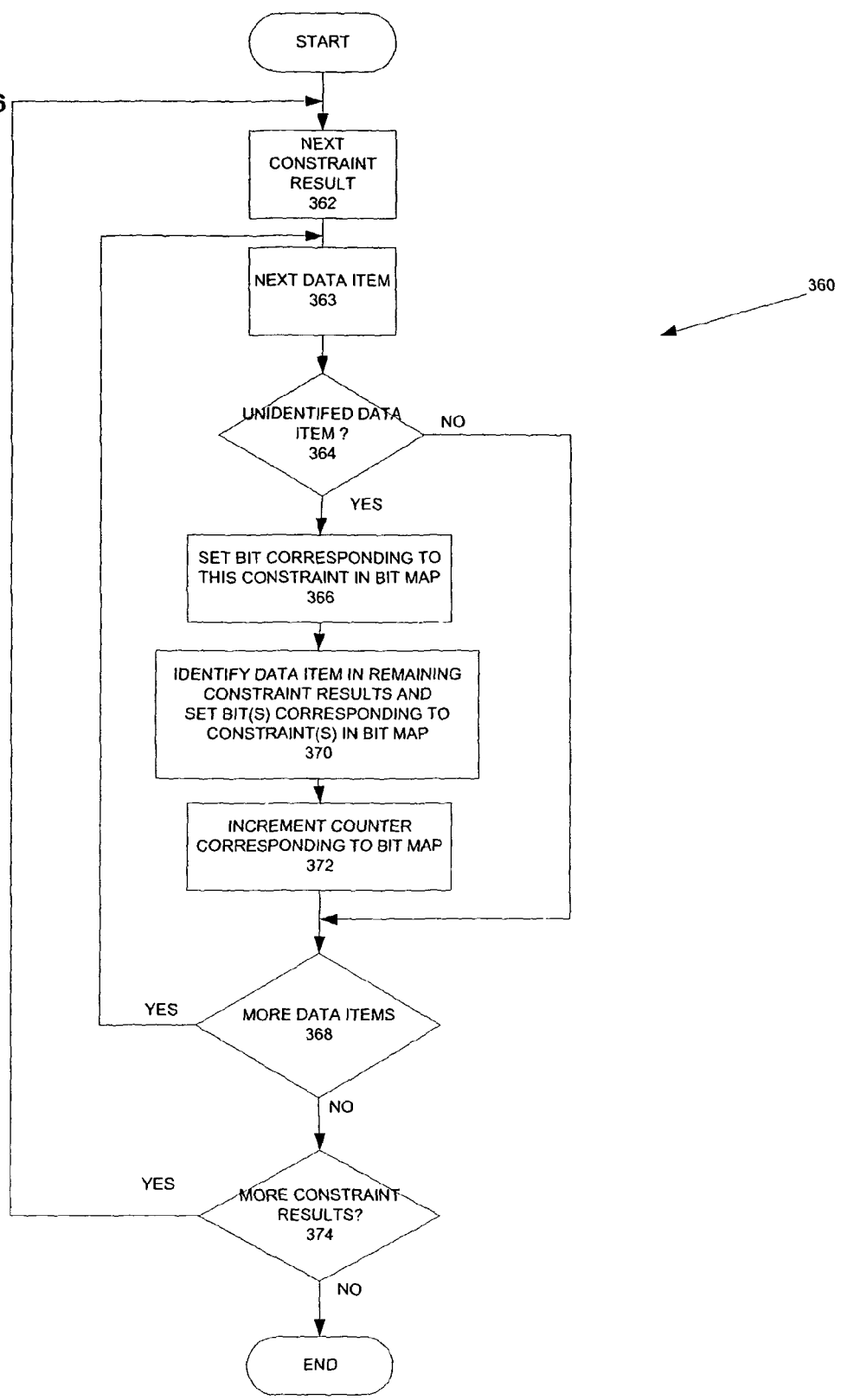
FIG. 16 is a flowchart illustrating a method, according to one embodiment, to generate bit maps and data item counters.

FIG. 16 is a flowchart of a method 360, according to one embodiment, to generate bit maps 158 and data item counters 103. The method 360 commences at operation 362 where the search engine 42 gets the next constraint result. At operation 363 the search engine 42 gets the next data item 82.

At decision operation 364, the search engine 42 determines if current data item 82 may be unidentified. If the current data item 82 is unidentified then a branch is made to operation 366. Otherwise a branch is made to decision operation 368.

At operation 366, the search engine 42 asserts the bit corresponding to the current constraint 102 in the bit map 158 that corresponds to the current data item 82.

At operation 370, the search engine 42 determines if the current data item 82 may be found in the remaining constraint results and, if found, the search engine 42 asserts the bit(s) that corresponds to the respective constraint results in the bit map 158.

At operation 372, the search engine 42 increments the data item counter 103 based on the value of the bit map 158.

At decision operation 368, the search engine 42 determines if there may be more data items 82 in the current constraint result. If there may be more data items 82 then a branch is made to decision operation 364. Otherwise a branch is made to decision operation 374.

At decision operation 374, the search engine 42 determines if there are more constraint results. If there are more constraint results then a branch is made to operation 362. Otherwise the method 360 ends.

Figure 17:
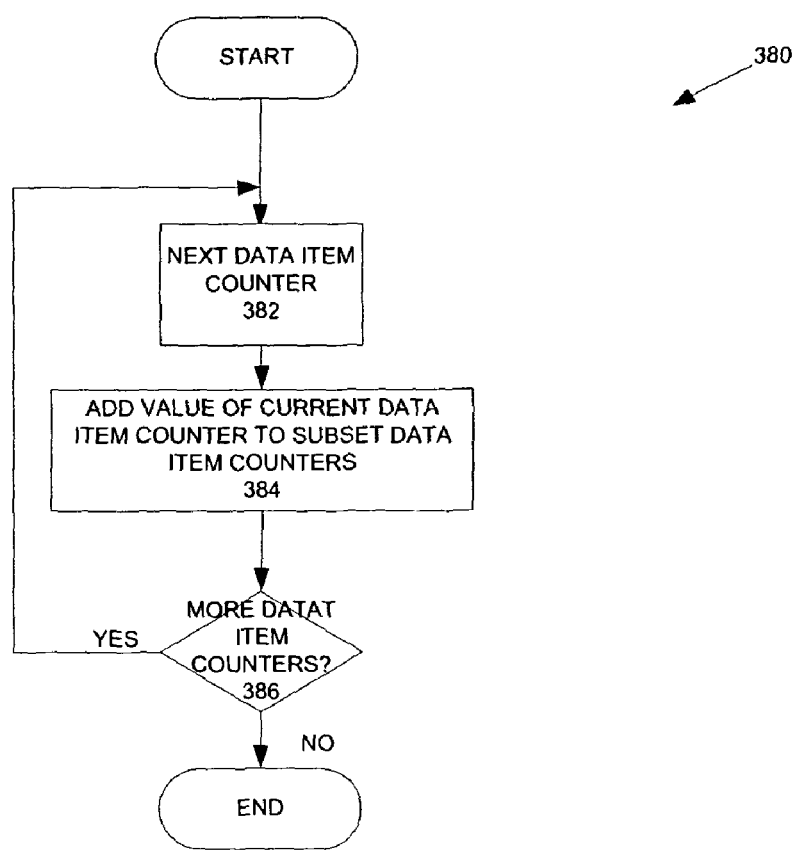
FIG. 17 is a flowchart illustrating a method, according to one embodiment, to add the value of a data item counter to subset data item counters.

FIG. 17 is a flowchart illustrating a method 380, according to one embodiment, to add the value of a data item counter 103 to subset data item counters 103. The method 380 commences at operation 382 where the search engine 42 gets the next data item counter 103.

At operation 384, the search engine 42 adds the value of the current data item counter 103 to subset data item counters 103 (e.g., data item counters 103 that may be included in a subset of the current data item counter 103).

At decision operation 386, the search engine 42 determines if there are more data item counters 103. If there are more data item counters 103 then a branch is made to operation 382. Otherwise the method 380 ends.

Embodiments of the above described system may provide technical advantages in the form of reduced network activity as a result of automatically generating search definitions 101 (e.g., data search requests) that may be selected by the user. In addition, other embodiments of the above described system may provide technical advantages in the form of a reduction in the number of accesses to the data source, the reduction of accesses due to calculating data item counters rather than executing queries against the data source.

Figure 26:
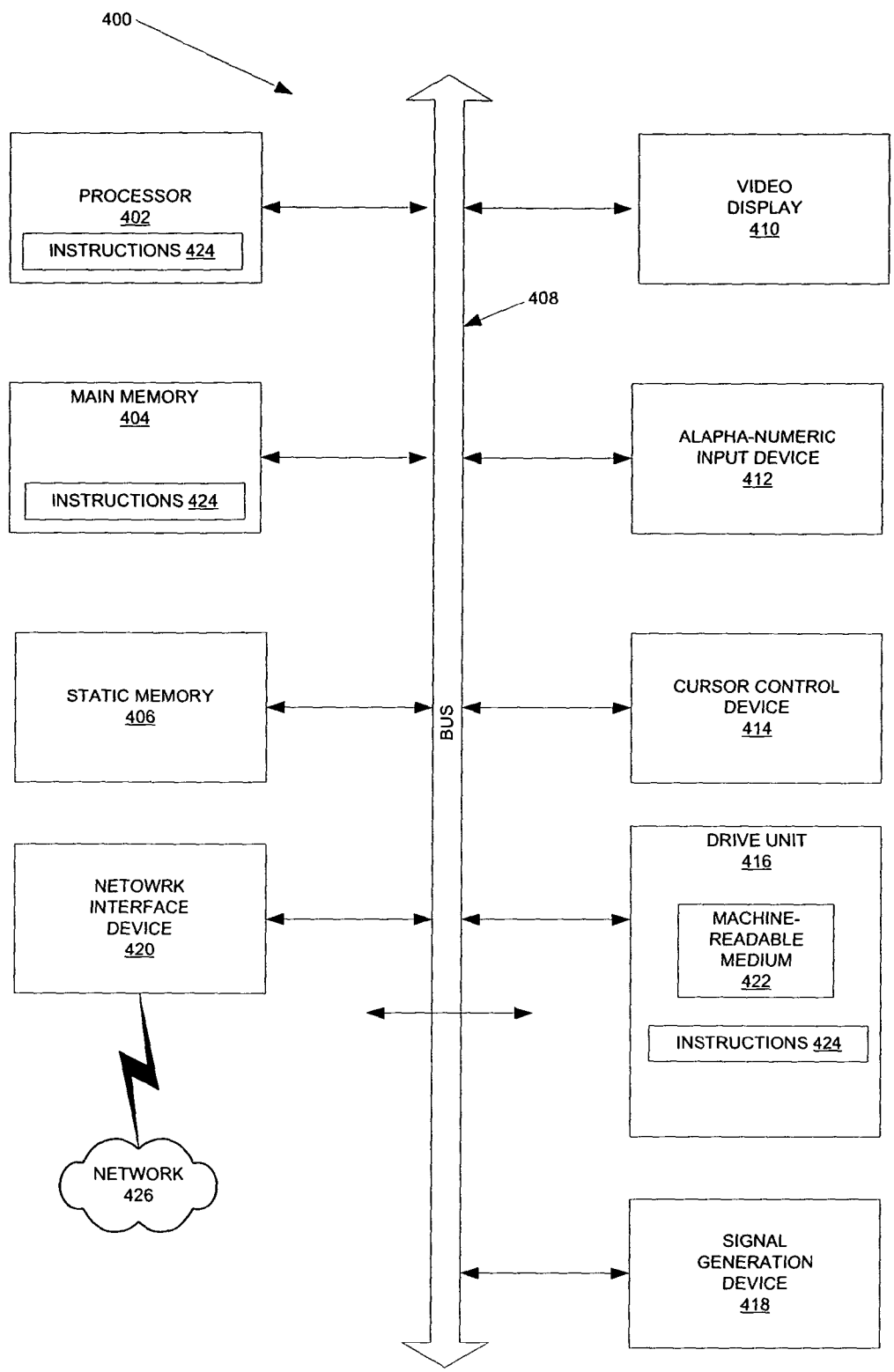
FIG. 26 is a block diagram of a machine, according to one embodiment.

FIG. 26 is a block diagram of a computer system, according to one embodiment. The example computer system 400 or machine or platform includes a processor 402 (e.g., a central processing unit (CPU) a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions (e.g., software 424) embodying any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to process a data search request have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to process a data search request, the system including:
    a query controller module to receive, via an interface of a computer system, the data search request, the data search request including a plurality of constraints corresponding to a query;
    a search engine to perform a search of a data source based on the data search request to find and count a number of data items;
    a reduced constraint builder module to formulate, within the computer system, a plurality of search definitions, in response to an identification of the number of data items in excess of a predetermined threshold minimum number of data items, wherein each search definition of a subset of the plurality of constraints is formulated to exclude at least one constraint;
    wherein the search engine is configured to perform a plurality of searches of the data source for each of the plurality of search definitions to generate a plurality of search results corresponding to each search definition, and to utilize the plurality of search results to calculate, within the computer system, a corresponding data item count for each search definition; and
    wherein the query controller module is configured to communicate, via the interface of the computer system, the count of data items for the each search definition, the plurality of search definitions, and the number of data items corresponding to the data search request to a client machine for simultaneous display.

2. The system of claim 1, wherein each of the search definitions is formulated to include a constraint set that is unique, and wherein the constraints of the constraint set are selected from a group including a keyword constraint, a category constraint, a search parameter constraint, and an attribute constraint.

3. The system of claim 2, wherein the query controller communicates at least one from a group including a list of constraint sets and a table of constraint sets.

4. The system of claim 3, wherein the table of constraint sets includes a predetermined plurality of columns and the list of constraint sets includes a predetermined plurality of rows.

5. The system of claim 2, wherein each constraint set is selectable by the user to display associated data items.

6. The system of claim 5, wherein the data items are located within the data source utilizing a user-selected constraint set.

7. The system of claim 2, wherein the query controller communicates each constraint set in a list in such a manner to identify at least one of the plurality of constraints that have been excluded from the respective constraint set.

8. The system of claim 2, wherein the query controller communicates a user interface that displays excluded constraints in a visually differentiated manner with respect to included constraints.

9. The system of claim 2, wherein the list of constraint sets is sorted according to a number of constraints, of the plurality of constraints, excluded from the respective constraint set.

10. The system of claim 2, wherein the list of constraint sets is sorted according to the number of data items located by a corresponding search definition.

11. The system of claim 2, wherein the reduced constraint builder module determines whether a constraint set associated with an excluded constraint corresponds to a count of data items that equals a count of data items associated with a constraint set without an excluded constraint, and if so, not displaying the search definition associated with the excluded constraint.

12. The system of claim 1, wherein the reduced constraint builder module removes predetermined constraints from each of the search definitions.

13. The system of claim 1, including a query builder module that determines whether the search request includes a predetermined threshold minimum number of constraints, and wherein the reduced constraints builder module formulates the plurality of search definitions if the number of constraints exceeds the predetermined threshold minimum number of constraints.

14. The system of claim 1, including a query builder module that determines whether the search request includes a predetermined threshold maximum number of constraints, and wherein the reduced constraints builder module formulates the plurality of search definitions if the number of constraints does not exceed the predetermined threshold maximum number of constraints.

15. The system of claim 1, wherein the search engine performs a search based on the data search request and the reduced constraint builder module formulates the plurality of search definitions if the number of data items found does not exceed a predetermined threshold maximum number of data items.

16. The system of claim 1, including an expansion module to identify predetermined sets of constraints included within the data search request as an atomic constraint, and wherein the reduced constraint builder module formulates the plurality of search definitions utilizing the atomic constraint to identify data items.

17. The system of claim 1, including an expansion module to automatically expand at least one constraint included within the search request.

18. The system of claim 17, wherein the expansion module automatically expands the at least one constraint generates an expression that includes the at least one constraint and a further constraint that is automatically determined to correspond to the at least one constraint.

19. The system of claim 18, wherein the expression is treated as a single constraint in the formulation of the plurality of search definitions.

20. The system of claim 2, wherein the reduced constraint builder module determines whether the constraint set includes a first constraint that is excluded from the constraint set, and if so, excludes a second constraint from the constraint set.

21. The system of claim 18, wherein the expansion module expands any one from a group of constraints including a keyword constraint to any one from a group of constraints including, a category constraint, a search parameter constraint, and an attribute constraint.

22. The system of claim 18, wherein the expansion module expands any one from a group of constraints including a category constraint to any one from a group of constraints including, a keyword constraint, a search parameter constraint, and an attribute constraint.

23. The system of claim 18, wherein the expansion module expands any one from a group of constraints including a search parameter constraint to any one from a group of constraints including, a category constraint, a keyword constraint, and an attribute constraint.

24. The system of claim 18, wherein the expansion module expands any one from a group of constraints including an attribute constraint to any one from a group of constraints including, a category constraint, a keyword constraint, and a search parameter constraint.

25. A computer-implemented method to process a data search request, the method including:
receiving, via an interface of a computer system, the data search request, the data search request including a plurality of constraints corresponding to a query;
performing a search of a data source based on the data search request to find and count a number of data items;
formulating, within the computer system, a plurality of search definitions, responsive to identifying the number of data items exceeding a predetermined threshold minimum number of data items, each search definition of a subset of the plurality of constraints being formulated to exclude at least one constraint;
performing a plurality of searches of the data source for each of the plurality of search definitions to generate a plurality of search results corresponding to each search definition; and
utilizing the plurality of search results, calculating, within the computer system, a corresponding data item count for each search definition; and communicating, via the interface of the computer system, the count of data items for the each search definition, the plurality of search definitions, and the number of data items corresponding to the data search request to a client machine for simultaneous display.

26. The computer-implemented method of claim 25, wherein each of the search definitions is formulated to include a constraint set that is unique, and wherein the constraints of the constraint set are selected from a group including a keyword constraint, a category constraint, a search parameter constraint, and an attribute constraint.

27. The computer-implemented method of claim 26, wherein the communicating includes communicating at least one from a group including a list of constraint sets and a table of constraint sets.

28. The computer-implemented method of claim 27, wherein the table of constraint sets includes a predetermined plurality of columns and the list of constraint sets includes a predetermined plurality of rows.

29. The computer-implemented method of claim 26, wherein each constraint set is selectable by the user to display associated data items.

30. The computer-implemented method of claim 29, wherein the data items are located within the data source utilizing a user-selected constraint set.

31. The computer-implemented method of claim 26, wherein the communicating includes communicating each constraint set in a list in such a manner to identify at least one of the plurality of constraints that have been excluded from the respective constraint set.

32. The computer-implemented method of claim 26, wherein the communicating includes communicating a user interface that displays excluded constraints in a visually differentiated manner with respect to included constraints.

33. The computer-implemented method of claim 26, wherein the list of constraint sets is sorted according to a number of constraints, of the plurality of constraints, excluded from the respective constraint set.

34. The computer-implemented method of claim 26, wherein the list of constraint sets is sorted according to the number of data items located by a corresponding search definition.

35. The computer implemented method of claim 26, including determining whether a constraint set associated with an excluded constraint corresponds to a count of data items that equals a count of data items associated with a constraint set without an excluded constraint, and if so, not displaying the search definition associated with the excluded constraint.

36. The computer-implemented method of claim 25, wherein the formulating of the plurality of search definitions includes removing predetermined constraints from each of the search definitions.

37. The computer-implemented method of claim 25, including determining whether the search request includes a predetermined threshold minimum number of constraints, and formulating the plurality of search definitions if the number of constraints exceeds the predetermined threshold minimum number of constraints.

38. The computer-implemented method of claim 25, including determining whether the search request includes a predetermined threshold maximum number of constraints, and formulating the plurality of search definitions if the number of constraints does not exceed the predetermined threshold maximum number of constraints.

39. The computer-implemented method of claim 25, including performing a search based on the data search request and formulating the plurality of search definitions if the number of data items found does not exceed a predetermined threshold maximum number of data items.

40. The computer-implemented method of claim 25, including identifying predetermined sets of constraints included within the search request as an atomic constraint, and formulating the plurality of search definitions utilizing the atomic constraint to identify data items.

41. The computer-implemented method of claim 25, automatically expanding at least one constraint included within the search request.

42. The computer-implemented method of claim 41, wherein the automatically expanding the at least one constraint includes generating an expression that includes the at least one constraint and a further constraint that is automatically determined to correspond to the at least one constraint.

43. The computer-implemented method of claim 42, wherein the expression is treated as a single constraint in the formulation of the plurality of search definitions.

44. The computer-implemented method of claim 26, including determining whether the constraint set includes a first constraint that is excluded from the constraint set, and if so, excluding a second constraint from the constraint set.

45. The computer-implemented method of claim 42, wherein the automatic expanding includes expanding any one from a group of constraints including a keyword constraint to any one from a group of constraints including, a category constraint, a search parameter constraint, and an attribute constraint.

46. The computer-implemented method of claim 42, wherein the automatic expansion includes expanding any one from a group of constraints including a category constraint to any one from a group of constraints including, a keyword constraint, a search parameter constraint, and an attribute constraint.

47. The computer-implemented method of claim 42, wherein the automatic expansion includes expanding any one from a group of constraints including a search parameter constraint to any one from a group of constraints including, a category constraint, a keyword constraint, and an attribute constraint.

48. The computer-implemented method of claim 42, wherein the automatic expansion includes expanding any one from a group of constraints including an attribute constraint to any one from a group of constraints including, a category constraint, a keyword constraint, and a search parameter constraint.

49. A machine-readable medium for storing a sequence of instructions that, when executed by a machine, cause the machine to:
receive, via an interface of a computer system, the data search request, the data search request including a plurality of constraints corresponding to a query;
perform a search of a data source based on the data search request to find and count a number of data items;
formulate, within the computer system, a plurality of search definitions responsive to an identification of the number of data items in excess of a predetermined threshold minimum number of data items, each search definition of a subset of the plurality of constraints being formulated to exclude at least one constraint;
perform a plurality of searches of the data source for each of the plurality of search definitions to generate a plurality of search results corresponding to each search definition;
utilizing the plurality of search results, calculating, within the computer system, a corresponding data item count for each search definition; and
communicating, via the interface of the computer system, the count of data items for each search definition, the plurality of search definitions, and the number of data items corresponding to the data search request to a client machine for simultaneous display.

50. A system to process a data search request, the system including:
a processor controlling operation of the system, including communication of information and control of a plurality of modules;
a query controller module to receive the data search request, the data search request including a plurality of constraints that includes a first keyword;
an expansion module to associate the first keyword to at least one category;
a search engine to perform a search of a data source based on the data search request to find and count a number of data items;
a reduced constraint builder module to formulate a search definition that includes the at least one category in response to an identification of the number of data items in excess of a predetermined threshold minimum number of data items, each search definition being formulated to exclude at least one constraint; and
a data source to store database tables, including a data item table, a configuration table, and a keyword expansion table, the data item table to store and retrieve data items, the configuration table to store various configurable parameters for the search engine, and the keyword expansion table to expand a keyword constraint to forms of the keyword constraint by the expansion module;

wherein the search engine is configured to perform a search of the data source based on the search definition, and to calculate a data item count for the search definition.

51. The system of claim 50, wherein the plurality of constraints includes a second keyword that is utilized in the search definition.

52. The system of claim 50, wherein the expansion module associates the second keyword to a second constraint that is included in the search definition, the second constraint to include any one of a group of alternate forms of the second keyword including a plural form of the second keyword, an alternate spelling of the second keyword, an alternate word form of the second keyword, an acronym of the second keyword, and a synonym of the second keyword.

53. The system of claim 50, wherein the expansion module identifies predetermined sets of constraints included within the search request as an atomic constraint, and wherein the reduced constraint builder module formulates the search definition utilizing the atomic constraint.

54. A computer-implemented method to process a data search request, the method including:
receiving the data search request, the data search request including a plurality of constraints that includes a first keyword;
associating the first keyword to at least one category;
performing a search of a data source based on the data search request to find and count a number of data items;
formulating a search definition that includes the at least one category in response to an identification of the number of data items in excess of a predetermined threshold minimum number of data items, the search definition formulated to exclude at least one constraint of the plurality of constraints;
performing a search of the data source based on the search definition; and
calculating a data item count corresponding to the search definition.

55. The computer-implemented method of claim 54, wherein the plurality of constraints includes a second keyword that is utilized in the search definition.

56. The computer-implemented method of claim 55, including associating the second keyword to a second constraint that is included in the search definition, the second constraint including any one of a group of alternate forms of the second keyword including a plural form of the second keyword, an alternate spelling of the second keyword, an alternate word form of the second keyword, an acronym of the second keyword, and a synonym of the second keyword.

57. The computer-implemented method of claim 55, including identifying predetermined sets of constraints included within the search request as an atomic constraint, and formulating the search definition utilizing the atomic constraint.

58. A machine-readable medium for storing a sequence of instructions that, when executed by a machine, cause the machine to:
receive the data search request, the data search request including a plurality of constraints that includes a first keyword;
associate the first keyword to at least one category;
search a data source based on the data search request to find and count a number of data items;
formulate a search definition that includes the at least one category in response to an identification of the number of data items in excess of a predetermined threshold minimum number of data items, the search definition formulated to exclude at least one constraint of the plurality of constraints;
perform a search of the data source based on the search definition; and
calculate a data item count corresponding to the search definition.

59. A system to process a data search request, the system including:
a first means to receive the data search request, the data search request including a plurality of constraints that includes a first keyword;
a second means to associate the first keyword to at least one category;
a search engine to perform a search of a data source based on the data search request to find and count a number of data items; and
a third means to formulate a search definition that includes the at least one category in response to an identification of the number of data items in excess of a predetermined threshold minimum number of data items, the search definition formulated to exclude at least one constraint of the plurality of constraints;
wherein the search engine is configured to perform a search of the data source based on the search definition.

* * * * *

UNITED STATES PATENT AND TRADEMARK OFFICE
CERTIFICATE OF CORRECTION

PATENT NO. : 8,332,383 B2
APPLICATION NO. : 11/238643
DATED : December 11, 2012
INVENTOR(S) : Posner et al.

It is certified that error appears in the above-identified patent and that said Letters Patent is hereby corrected as shown below:

On the face page, in column 2, under "Other Publications", line 1, before "U.S.", insert --"--, therefor On the face page, in column 2, under "Other Publications", line 2, after "2008", insert --"--, therefor On page 2, in column 1, under "Other Publications", line 1, before "U.S.", insert --"--, therefor On page 2, in column 1, under "Other Publications", line 1, after "11/363,679", insert --,--, therefor On page 2, in column 1, under "Other Publications", line 2, after "2008", insert --"--, therefor On page 2, in column 1, under "Other Publications", line 3, before "U.S.", insert --"--, therefor On page 2, in column 1, under "Other Publications", line 3, after "2009", insert --"--, therefor On page 2, in column 1, under "Other Publications", line 5, before "U.S.", insert --"--, therefor On page 2, in column 1, under "Other Publications", line 6, after "2009", insert --"--, therefor On page 2, in column 1, under "Other Publications", line 7, before "Chinese", insert --"--, therefor On page 2, in column 1, under "Other Publications", line 7, delete "200780015514.2,Office" and insert --200780015514.2, Office--, therefor On page 2, in column 1, under "Other Publications", line 8, delete "Mailed" and insert --mailed--, therefor On page 2, in column 1, under "Other Publications", line 8, after "2009", insert --"--, therefor On page 2, in column 1, under "Other Publications", line 9, before "European", insert --"--, therefor Signed and Sealed this
Second Day of April, 2013

Teresa Stanek Rea
*Acting Director of the United States Patent and Trademark Office*

CERTIFICATE OF CORRECTION (continued)
U.S. Pat. No. 8,332,383 B2

On page 2, in column 1, under "Other Publications", line 9, after "mailed", delete "on", therefor On page 2, in column 1, under "Other Publications", line 10, after "2009", insert --"--, therefor On page 2, in column 1, under "Other Publications", line 11, before "European", insert --"--, therefor On page 2, in column 1, under "Other Publications", line 12, after "2009" insert --"--, therefor On page 2, in column 2, under "Other Publications", line 3, delete "I," and insert --I.,--, therefor On page 2, in column 2, under "Other Publications", line 8, before "4 pgs.", delete "PCT/US05/17024," therefor On page 2, in column 2, under "Other Publications", line 9, before "U.S.", insert --"--, therefor On page 2, in column 2, under "Other Publications", line 10, after "2010", insert --"--, therefor On page 2, in column 2, under "Other Publications", line 11, after "11/363,679", insert --,--, therefor On page 2, in column 2, under "Other Publications", line 12, after "10", insert --pgs.--, therefor On page 2, in column 2, under "Other Publications", line 25, delete "200580051098.2 ,Office" and insert --200580051098.2, Office--, therefor On page 2, in column 2, under "Other Publications", line 29-30, Before ""Chinese Application Serial No. 200580051098.2, Response filed Dec. 17, 2010 to Non Final Office Action mailed Aug. 4, 2010", 18 pgs.", delete ""U.S. Appl. No. 11/363,679, Non Final Office Action mailed Jan. 24, 2011", 8 pgs.", therefor On page 2, in column 2, under "Other Publications", line 37, delete "2010"." and insert --2010", 7 pgs.--, therefor On page 2, in column 2, under "Other Publications", line 39, delete "Aug. 1, 2011" and insert --Feb. 1, 2011--, therefor On page 2, in column 2, under "Other Publications", line 53, after "Action", insert --mailed--, therefor On page 2, in column 2, under "Other Publications", line 54, delete "05770183.1--Office Action Response"" and insert --05770183.1, Office Action Response filed Jun. 20, 2011",--, therefor On page 2, in column 2, under "Other Publications", line 56, delete "07751791.0--Office Action Response"" and insert --07751791.0, Office Action Response filed Jun. 5, 2011",--, therefor

CERTIFICATE OF CORRECTION (continued)
U.S. Pat. No. 8,332,383 B2

In the drawings, on sheet 1 of 26, in Figure 1, reference numeral 18, delete "PROGRAMATIC" and insert --PROGRAMMATIC--, therefor On Sheet 1 of 26, Fig. 1, reference numeral 12, line 1, delete "STORAGE AND INFORMATION RETRIEVAL PLATFORM 12" and insert --INFORMATION STORAGE AND RETRIEVAL PLATFORM 12--, therefor On Sheet 4 of 26, Fig. 4, reference numeral 98, line 2, delete "PARAMENTER" and insert --PARAMETER--, therefor On Sheet 7 of 26, Fig. 7, Table 140, reference numeral 108, line 4, delete "CONSTAINT" and insert --CONSTRAINT--, therefor On Sheet 7 of 26, Fig. 7, Table 140, reference numeral 106, line 5, delete "ATTIRBUTE" and insert --(ATTRIBUTE--, therefor On Sheet 7 of 26, Fig. 7, Table 142, reference numeral 106, line 5, delete "ATTIRBUTE" and insert --(ATTRIBUTE--, therefor On Sheet 7 of 26, Fig. 7, Table 144, reference numeral 106, line 5, delete "ATTIRBUTE" and insert --(ATTRIBUTE--, therefor On Sheet 7 of 26, Fig. 7, Table 146, reference numeral 104, line 5, delete "KEYWORD" and insert --(KEYWORD--, therefor On Sheet 11 of 26, Fig. 11, reference numeral 186, line 3, delete "DEFINTIONS" and insert --DEFINITIONS--, therefor On Sheet 11 of 26, Fig. 11, reference numeral 198, line 3, delete "CONTSTRAINTS" and insert --CONSTRAINTS--, therefor On Sheet 15 of 26, Fig. 15, reference numeral 240, line 3, delete "DEFINTIONS" and insert --DEFINITIONS--, therefor On Sheet 16 of 26, Fig. 16, reference numeral 364, line 1, delete "UNIDENTIFED" and insert --UNIDENTIFIED--, therefor On Sheet 17 of 26, Fig. 17, reference numeral 386, line 1, delete "DATAT" and insert --DATA--, therefor On Sheet 26 of 26, Fig. 26, reference numeral 412, line 1, delete "ALAPHA" and insert --ALPHA--, therefor In column 3, line 30, before "a", insert --as--, therefor In column 5, line 46, after ""goblet")", insert --.--, therefor In column 5, line 52, delete ""England," and insert --"England",--, therefor In column 6, line 2, delete "62" and insert --82--, therefor In column 6, line 9, delete "108" and insert --106--, therefor In column 7, line 13, after "expression", insert --138--, therefor In column 7, line 25, delete "136" and insert --140--, therefor In column 7, line 29, delete "special" and insert --search--, therefor In column 9, line 52, delete "104," and insert --106,--, therefor In column 9, line 65, delete "counts" and insert --counters--, therefor In column 10, line 33, after "search", insert --parameter--, therefor In column 10, line 43, after "102", insert --.--, therefor In column 10, line 46, after ""California"", insert --.--, therefor In column 11, line 58, delete "106" and insert --108--, therefor In column 11, line 60, delete "105" and insert --106--, therefor In column 11, line 63, delete "161" and insert --130--, therefor In column 12, line 19, after ""Harry Potter"", insert --).--, therefor In column 15, line 36, after "(CPU)", insert --,--, therefor In column 18, line 33, in claim 25, after "and", insert --¶--, therefor